United States Patent
Murayama et al.

(10) Patent No.: US 11,677,515 B2
(45) Date of Patent: Jun. 13, 2023

(54) RETRANSMISSION CONTROL DEVICE, METHOD, AND COMPUTER READABLE MEDIUM FOR TIME SENSITIVE NETWORK COMMUNICATIONS

(71) Applicant: MITSUBISHI ELECTRIC CORPORATION, Tokyo (JP)

(72) Inventors: Kazuhiro Murayama, Tokyo (JP); Takafumi Muraoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 74 days.

(21) Appl. No.: 17/028,065

(22) Filed: Sep. 22, 2020

(65) Prior Publication Data

US 2021/0006359 A1    Jan. 7, 2021

Related U.S. Application Data

(63) Continuation of application No. PCT/JP2018/019434, filed on May 21, 2018.

(51) Int. Cl.
| | | |
|---|---|---|
| H04L 1/1867 | (2023.01) | |
| H04L 5/00 | (2006.01) | |
| H04W 60/00 | (2009.01) | |
| H04W 72/0446 | (2023.01) | |

(52) U.S. Cl.
CPC .......... *H04L 1/189* (2013.01); *H04L 5/0055* (2013.01); *H04W 60/00* (2013.01); *H04W 72/0446* (2013.01)

(58) Field of Classification Search
CPC ...... H04L 1/189; H04L 5/0055; H04W 60/00; H04W 72/0446
See application file for complete search history.

(56) References Cited

U.S. PATENT DOCUMENTS

| | | | |
|---|---|---|---|
| 6,097,731 A | 8/2000 | Aoki | |
| 2005/0138310 A1* | 6/2005 | Horiuchi | G06F 11/1443 714/E11.101 |
| 2010/0165848 A1 | 7/2010 | Iwazaki et al. | |

(Continued)

FOREIGN PATENT DOCUMENTS

| | | | |
|---|---|---|---|
| JP | 10-136053 A | 5/1998 | |
| JP | 10-290353 A | 10/1998 | |

(Continued)

OTHER PUBLICATIONS

German Office Action, dated Jul. 30, 2021, for German Application No. 112018007489.7, with an English translation.

(Continued)

*Primary Examiner* — Michael Thier
*Assistant Examiner* — Nevena Zecevic Sandhu
(74) *Attorney, Agent, or Firm* — Birch, Stewart, Kolasch & Birch, LLP

(57) ABSTRACT

A communication device (101) transmits data by switching types of data to be transmitted by a unit of a time slot. A data transmission unit (6) transmits transmission data during a time slot corresponding to a type of the transmission data. Further, the data transmission unit (6) decides a retransmission time for performing a retransmission of the transmission data based on a time when a transmission of the transmission data has been completed.

9 Claims, 13 Drawing Sheets

(56) References Cited

U.S. PATENT DOCUMENTS

| | | | |
|---|---|---|---|
| 2011/0280240 A1 | 11/2011 | Yamagaki et al. | |
| 2015/0163741 A1* | 6/2015 | Sheth | H04L 1/188 370/311 |
| 2017/0331748 A1 | 11/2017 | Mangin | |
| 2019/0322298 A1* | 10/2019 | Mong | H04L 47/24 |
| 2019/0342886 A1 | 11/2019 | Osagawa et al. | |

FOREIGN PATENT DOCUMENTS

| | | | |
|---|---|---|---|
| JP | 11-74946 A | 3/1999 | |
| JP | 2003-174470 A | 6/2003 | |
| JP | 2008-306551 A | 12/2008 | |
| WO | WO 2011/074454 A1 | 6/2011 | |
| WO | WO-2016129205 A1 * | 8/2016 | H04L 47/22 |
| WO | WO 2018/087927 A1 | 5/2018 | |

OTHER PUBLICATIONS

International Search Report (PCT/ISA/210) issued in PCT/JP2018/019434, dated Jul. 24, 2018.

* cited by examiner

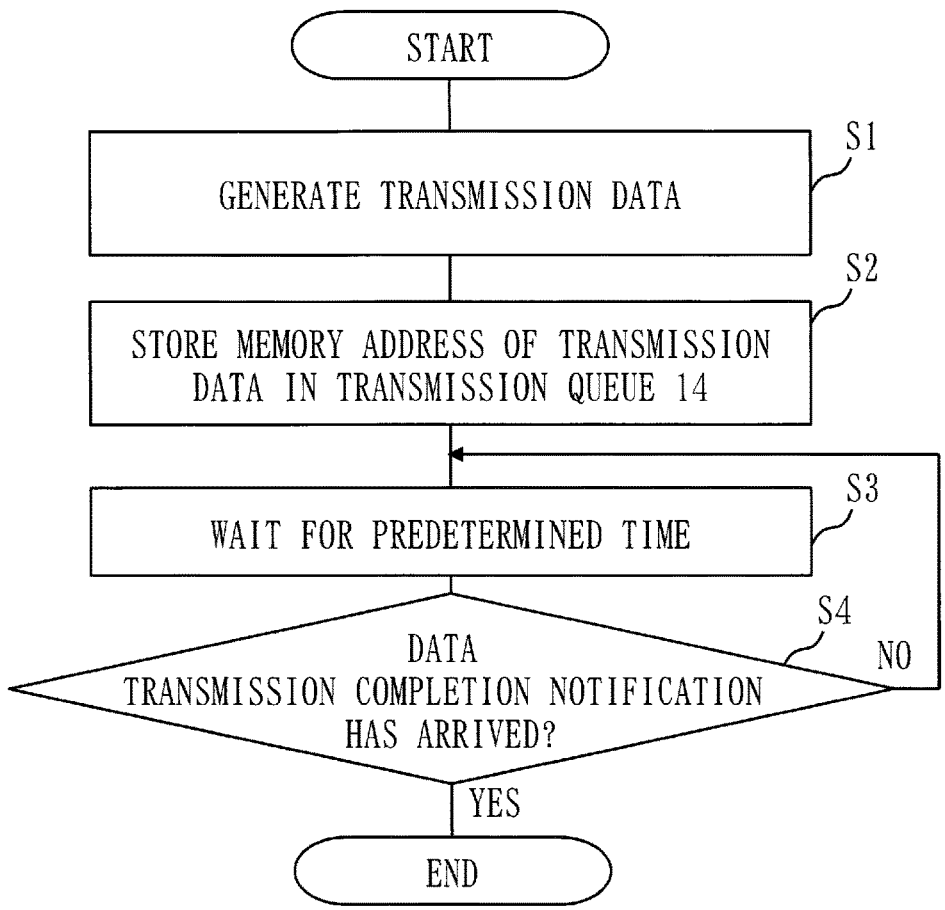
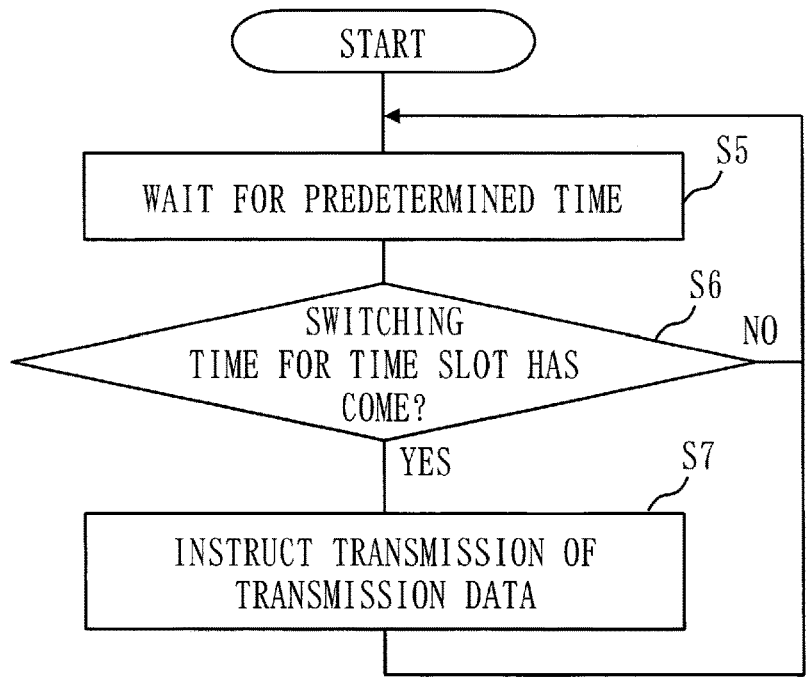

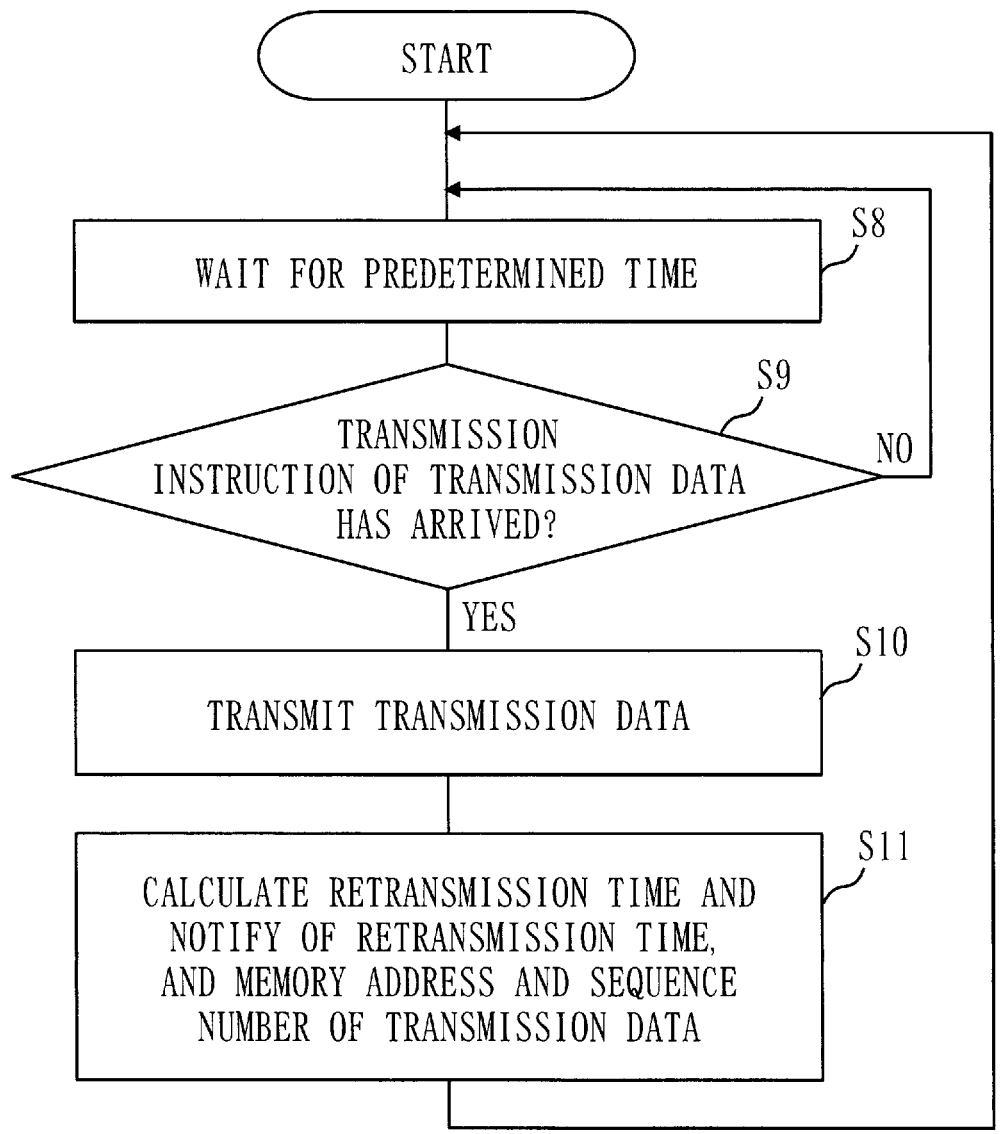

RETRANSMISSION CONTROL DEVICE, METHOD, AND COMPUTER READABLE MEDIUM FOR TIME SENSITIVE NETWORK COMMUNICATIONS

CROSS REFERENCE TO RELATED APPLICATIONS

This application is a Continuation of PCT International Application No. PCT/JP2018/019434, filed on May 21, 2018, which is hereby expressly incorporated by reference into the present application.

TECHNICAL FIELD

The present invention relates to data transmission control.

BACKGROUND ART

In recent years, Time Sensitive Networking (TSN) technology such as IEEE802.1Qbv and IEEE802.1AS is beginning to be applied to communication performed in a control network.

In the TSN, a communication cycle is divided into a plurality of time slots (TSs). Then, in the TSN, types of data are switched by a unit of a TS, and data is transmitted. Further, in the TSN, the TS is assigned for each protocol in many cases. For example, it is conceivable that a time slot 0 (TS0) is assigned to communication of TCP/IP (Transmission Control Protocol/Internet Protocol) and a time slot 1 (TS1) is assigned to communication of FA (Factor Automation).

FIG. 16 illustrates an example of a communication sequence in the TSN. In the TSN, data is stored in a transmission queue (the transmission queue is provided by IEEE802.1Qbv) of a corresponding TS, and when a start time of the TS comes, the data stored in the transmission queues of the TS is sequentially transmitted. On a receiving side, when the data is received, the data is delivered to a reception application without storing the data in a reception queue.

In FIG. 16, a periodic communication of 30 seconds is performed. Then, in FIG. 16, the cycle is divided into three TSs. That is, 10 seconds are assigned to each of the TSs.

Further, in FIG. 16, the data of a transmission application 0 is transmitted in TS0. The transmission application 0 inserts data 0 into a transmission queue for the TS0 at a time "00:00:06". Since the time "00:00:06" is a time in the TS0, the data 0 is transmitted during the TS0 without a waiting time.

On the other hand, the data of a transmission application 1 is transmitted in TS1. The transmission application 1 inserts data 1 into a transmission queue for the TS1 at a time "00:00:31". Since the time "00:00:31" is a time in the TS0, the data 1 is kept waiting in the transmission queue for the TS1. Then, after a time "00:00:40" comes and the TS1 is started, the data 1 is transmitted.

The TSN is also applied to communication that requires certainty such as TCP/IP communication which is performed on a control network. In the TCP/IP communication, when a packet arrives at a communication device on a receiving side, a reception confirmation (ACK data) is transmitted to a communication device on a transmitting side of the packet. Also, in the TCP/IP communication, if the communication device on the transmitting side does not receive the ACK data within a predetermined time, the communication device on the transmitting side retransmits the packet.

When the TSN is applied to the TCP/IP communication, a following problem occurs if the TS for the TCP/IP communication and a transmission timing of the ACK data do not match.

If a current TS is not the TS for the TCP/IP communication when the communication device on the receiving side tries to transmit the ACK data, the communication device on the receiving side suspends the transmission of the ACK data until the TS for the TCP/IP communication comes. As a result, the ACK data does not arrive at the communication device on the transmitting side within a predetermined time, which thus causes the communication device on the transmitting side to retransmit the packet. In this way, when the TSN is applied to the TCP/IP communication, the packet is retransmitted from the communication device on the transmitting side, even though the packet has arrived at the communication device on the receiving side. Consequently, a bandwidth of the network is wasted.

In order to deal with such a situation, for example, Patent Literature 1 discloses a technique of setting a time from the transmission of the packet until the retransmission, to be sufficiently long.

CITATION LIST

Patent Literature

Patent Literature 1: JP11-074946A

SUMMARY OF INVENTION

Technical Problem

When a method of Patent Literature 1 is applied to the TSN, a situation occurs in which the retransmission takes place although the data actually has arrived at the communication device on the receiving side.

When the method of Patent Literature 1 is applied to the TSN, a retransmission time is calculated based on a time when the transmission application stores the data in the transmission queue. As described above, in the TSN, the data cannot be transmitted unless the time slot corresponding to the type of data comes. Therefore, if it takes time until the corresponding time slot comes, there arises a significant difference between a time at which the transmission application stores the data in the transmission queue and a time at which the data transmission is actually completed. Therefore, even if the communication device on the receiving side has received the data, the retransmission time may come before the ACK data arrives at the communication device on the transmitting side, and a wasteful data retransmission may occur.

The present invention has been made in consideration of the above circumstances, and mainly aims to realize an efficient data transmission in a configuration in which data is transmitted by switching types of data to be transmitted by a unit of a time slot, such as TSN.

Solution to Problem

A communication device according to the present invention, the communication device transmitting data by switching types of data to be transmitted by a unit of a time slot, includes:

a transmission unit to transmit transmission data during a time slot corresponding to a type of the transmission data; and a retransmission time decision unit to decide a retransmission time for performing a retransmission of the transmission data based on a time when the transmission unit has completed a transmission of the transmission data.

Advantageous Effects of Invention

According to the present invention, it is possible to realize an efficient data transmission in a configuration in which data is transmitted by switching types of data to be transmitted by a unit of a time slot.

BRIEF DESCRIPTION OF DRAWINGS

FIG. 5 is a flowchart illustrating an operation example of a transmission control unit according to the first embodiment;

FIG. 6 is a flowchart illustrating an operation example of a time slot management unit according to the first embodiment;

FIG. 7 is a flowchart illustrating an operation example of a data transmission unit according to the first embodiment;

DESCRIPTION OF EMBODIMENTS

Figure 1:
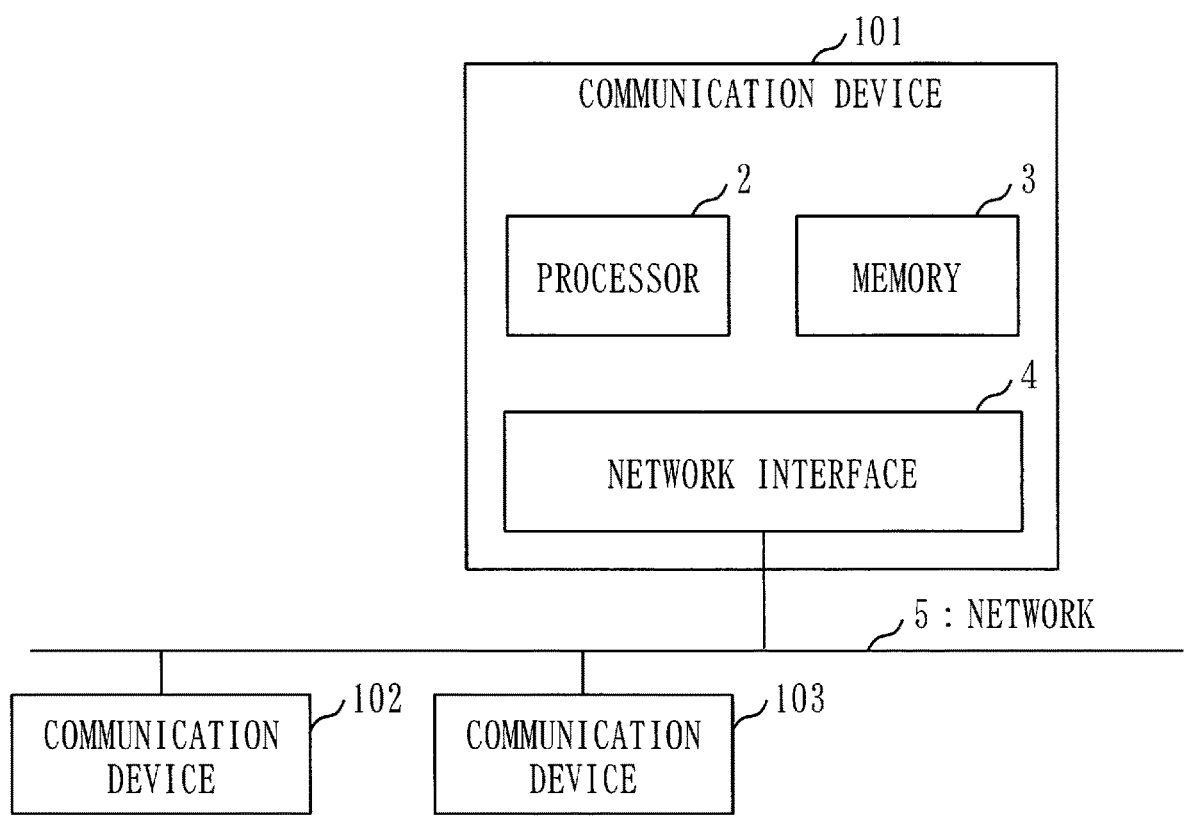
FIG. 1 is a diagram illustrating a configuration example of a data communication system according to a first embodiment.

Hereinafter, embodiments of the present invention will be described with reference to the drawings. In the following description of the embodiments and the drawings, the same reference numerals indicate the same or corresponding parts First Embodiment

*Description of Configuration*

FIG. 1 illustrates a configuration example of a communication system according to the present embodiment.

In the communication system according to the present embodiment, a communication device 101, a communication device 102, and a communication device 103 are connected to a network 5.

In FIG. 1, the communication system includes the communication device 101, the communication device 102, and the communication device 103, but the number of communication devices included in the communication system may be three or more. The communication device 101, the communication device 102, and the communication device 103 transmit and receive data according to TSN.

In FIG. 1, a hardware configuration of the communication device 101 is illustrated. The communication device 102 and the communication device 103 also have the same hardware configuration as that of the communication device 101.

The communication device 101, the communication device 102, and the communication device 103 are computers.

As illustrated in FIG. 1, the communication device 101 includes a processor 2, a memory 3, and a network interface 4 as hardware.

Figure 2:
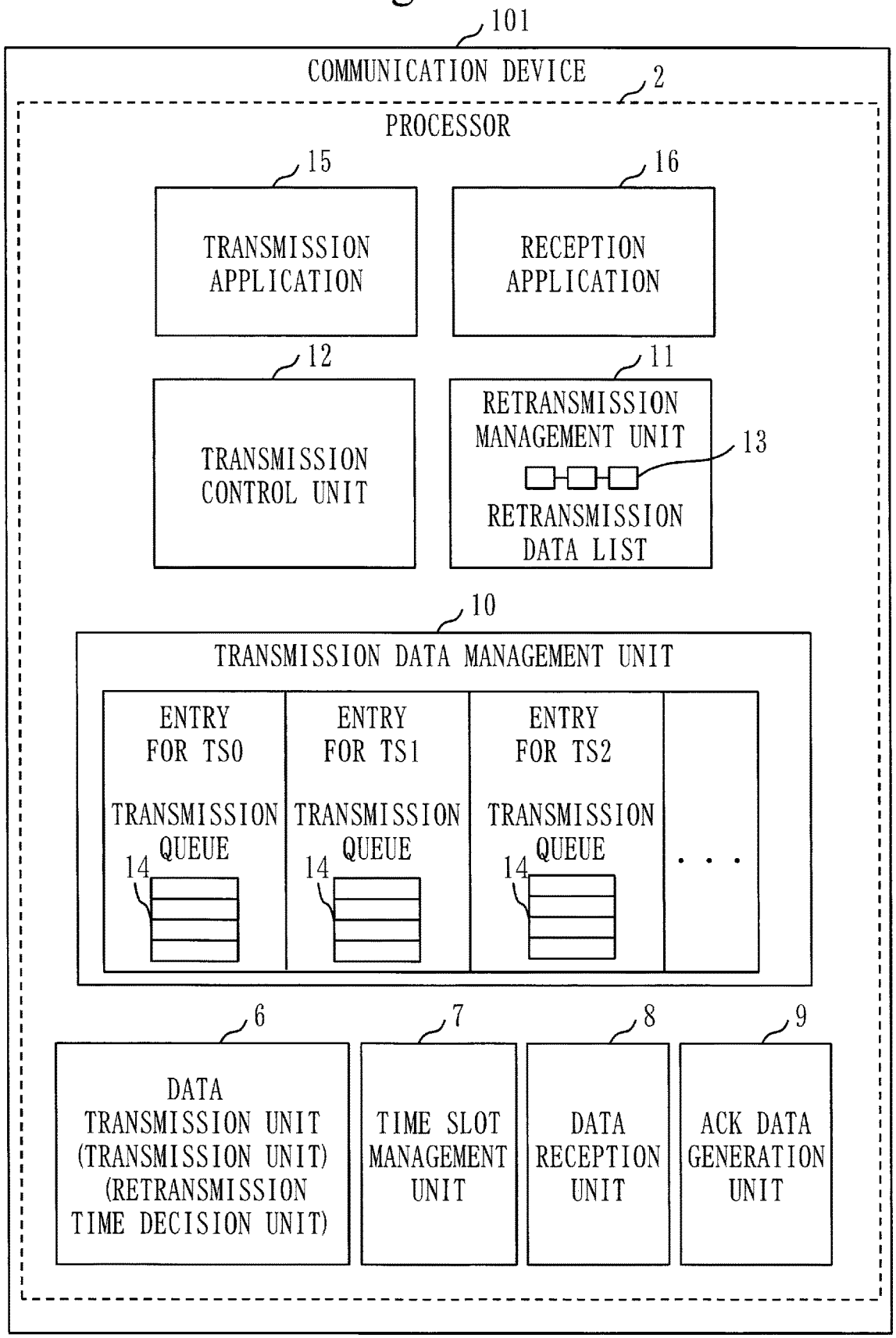
FIG. 2 is a diagram illustrating a functional configuration example of a communication device according to the first embodiment.

A transmission application 15 and a reception application 16 which are illustrated in FIG. 2 are stored in the memory 3. Also, the memory 3 stores a program that implements functions of a data transmission unit 6, a time slot management unit 7, a data reception unit 8, an ACK data generation unit 9, a retransmission management unit 11, and a transmission control unit 12 which are illustrated in FIG. 2.

The processor 2 executes the transmission application 15 and the reception application 16 in the memory 3. Also, the processor 2 executes the program that implements the functions of the data transmission unit 6, the time slot management unit 7, the data reception unit 8, the ACK data generation unit 9, the retransmission management unit 11, and the transmission control unit 12. Then, the processor 2 performs operations of the data transmission unit 6, the time slot management unit 7, the data reception unit 8, the ACK data generation unit 9, the retransmission management unit 11, and the transmission control unit 12.

FIG. 2 illustrates a functional configuration example of the communication device 101. Although FIG. 2 illustrates only the functional configuration example of the communication device 101, the communication device 102 and the communication device 103 also have the same functional configuration as that of the communication device 101.

The data transmission unit 6 transmits data by switching types of data to be transmitted by a unit of a time slot (TS).

More specifically, the data transmission unit 6 transmits transmission data stored in a transmission queue 14 in the transmission data management unit 10 during a time slot corresponding to a type of the transmission data.

Further, the data transmission unit 6 decides a retransmission time for performing a retransmission of the transmission data based on a time when the transmission of the transmission data has been completed.

Further, the data transmission unit 6 retransmits the transmission data if the retransmission of the transmission data is instructed.

The data transmission unit 6 corresponds to a transmission unit and a retransmission time decision unit. Further, a process performed by the data transmission unit 6 corresponds to a transmission process and a retransmission time decision process.

The time slot management unit 7 holds a current time, notifies the data transmission unit 6 of a transmission queue 14 corresponding to a current time slot when a time to switch time slots comes. Then, the time slot management unit 7 instructs the data transmission unit 6 to transmit the transmission data.

The data reception unit 8 receives the data transmitted from the communication device 102 or the communication device 103. Also, the data reception unit 8 delivers the received data to the reception application 16. Further, the data reception unit 8 instructs the ACK data generation unit to transmit a reception confirmation (ACK data) for the received data.

The ACK data generation unit 9 stores the ACK data in the corresponding transmission queue 14 of the transmission data management unit 10 according to the instruction from the data reception unit 8.

The transmission data management unit 10 has an entry for each time slot. The transmission queue 14 is provided for each entry. The transmission queue 14 holds a memory address of the transmission data or a memory address of the ACK data.

The retransmission management unit 11 manages the retransmission of the transmission data transmitted by the data transmission unit 6.

Specifically, the retransmission management unit 11 registers in a retransmission data list 13, the transmission data transmitted by the data transmission unit 6 and the retransmission time decided by the data transmission unit 6.

Figure 3:
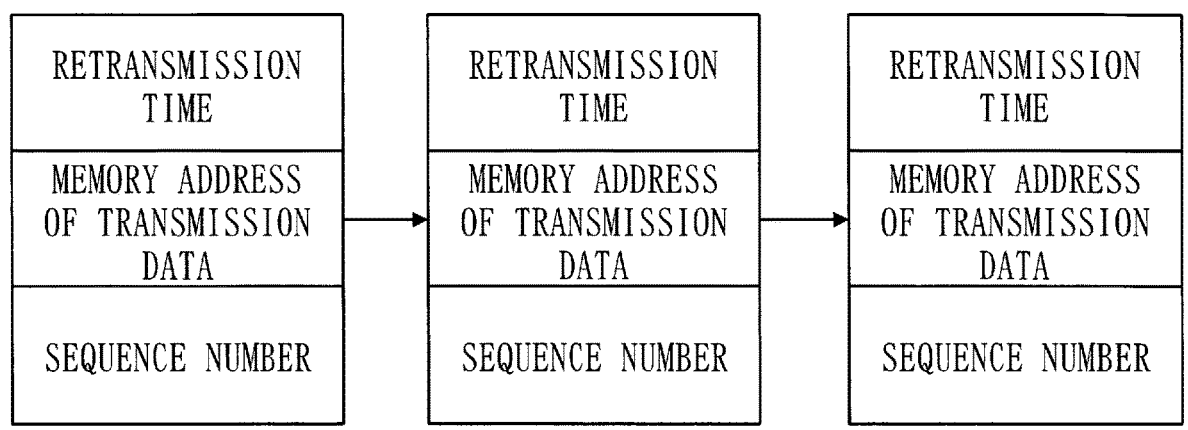
FIG. 3 is a diagram illustrating a configuration example of a retransmission data list according to the first embodiment.
Figure 4:
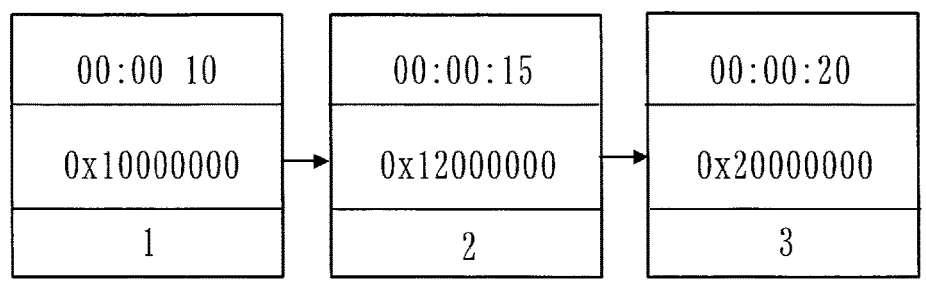
FIG. 4 is a diagram illustrating an example of the retransmission data list according to the first embodiment.

FIG. 3 illustrates a configuration example of the retransmission data list 13. Each entry in the retransmission data list 13 stores the retransmission time, the memory address of the transmission data to be retransmitted, and a sequence number which is an identifier of the transmission data. The entries in the retransmission data list 13 are arranged in the ascending order of the retransmission time. FIG. 4 illustrates a specific example of the retransmission data list 13. Besides, although in the present embodiment, an example is described in which the memory address of the transmission data is registered in the retransmission data list 13, a transmission data itself may be registered in the retransmission data list 13 instead of the memory address.

The retransmission management unit 11 decides the retransmission of the transmission data if the ACK data corresponding to the transmission data has not been received by the retransmission time.

A process performed by the retransmission management unit 11 corresponds to a retransmission management process.

The transmission control unit 12 generates the transmission data based on an instruction of the transmission application 15. Further, the transmission control unit 12 stores the transmission data in the transmission queue 14 of the corresponding time slot.

A process performed by the transmission control unit 12 corresponds to a transmission control process.

The transmission application 15 instructs the transmission control unit 12 to generate the transmission data. The transmission application 15 outputs, for example, a content to be transmitted, to the transmission control unit 12 and instructs generation of the transmission data.

The reception application 16 acquires the data received by the data reception unit 8 from the data reception unit 8.

In the present embodiment, a type of the transmission data is assumed to be a protocol of the transmission data. That is, in the present embodiment, it is assumed that the time slot is assigned to each protocol of the transmission data. Hereinafter, the time slot assigned to the protocol of the transmission data is referred to as a transmission time slot. That is, the transmission data is not transmitted during a time slot other than the transmission time slot, and is transmitted only during the transmission time slot.

The ACK data for the transmission data is transmitted only during the transmission time slot. That is, if the time slot (transmission time slot) corresponding to the transmission data is a time slot 0, the ACK data for the transmission data is transmitted only during the time slot 0. If the ACK data is not transmitted within the time slot 0 during which the transmission data has been transmitted, the ACK data is transmitted during a time slot 0 which comes next.

\*\*\*Description of Operation\*\*\*

An operation example of the communication device 101 according to the present embodiment will be described.

The operation example will be described below as an operation of the communication device 101, but operations of the communication device 102 and the communication device 103 are also the same.

An operation procedure described below corresponds to a communication method and a communication program of the present application.

First, an operation example of the transmission control unit 12 according to the present embodiment will be described with reference to FIG. 5.

In step S1, the transmission control unit 12 acquires a content from the transmission application 15 and generates transmission data.

Next, in step S2, the transmission control unit 12 stores a memory address of the transmission data generated in step S1 in a corresponding transmission queue 14.

That is, the transmission control unit 12 stores the memory address of the transmission data generated in step S1 in the transmission queue 14 of an entry of a time slot corresponding to a protocol of the transmission data, among a plurality of transmission queues 14 managed by the transmission data management unit 10.

Next, in step S3, the transmission control unit 12 waits for a predetermined time.

Next, in step S4, the transmission control unit 12 checks whether or not a data transmission completion notification has arrived from the data transmission unit 6.

If the data transmission completion notification has not arrived, the transmission control unit 12 repeats steps S3 and S4 until the data transmission completion notification arrives.

When the data transmission completion notification arrives, the transmission control unit 12 ends the process.

Next, an operation example of the time slot management unit 7 will be described with reference to FIG. 6.

First, in step S5, the time slot management unit 7 waits for a predetermined time.

Next, in step S6, the time slot management unit 7 checks whether or not a switching time for time slots has come. If the switching time for the time slots has come, the time slot management unit 7 proceeds to step S7.

In step S7, the time slot management unit 7 instructs the data transmission unit 6 to transmit the transmission data. After that, the time slot management unit 7 returns to step S5. More specifically, the time slot management unit 7 notifies the data transmission unit 6 of a transmission queue 14 corresponding to a current time slot, and instructs the data transmission unit 6 to transmit the transmission data.

If the switching time for the time slot has not come, the time slot management unit 7 repeats steps S5 and S6 until the switching time for the time slot comes.

Next, an operation example of the data transmission unit 6 will be described with reference to FIG. 7.

First, in step S8, the data transmission unit 6 waits for a predetermined time.

Next, in step S9, the data transmission unit 6 checks whether or not a transmission instruction of the transmission data has arrived.

There are a case in which the transmission instruction arrives from the time slot management unit 7 and a case in which the transmission instruction arrives from the retransmission management unit 11.

If the transmission instruction has not arrived, the data transmission unit 6 repeats steps S8 and S9 until the transmission instruction arrives.

If the transmission instruction has arrived, the data transmission unit 6 proceeds to step S10.

In step S10, the data transmission unit 6 transmits the transmission data to the network 5.

When the transmission instruction has arrived from the time slot management unit 7, the data transmission unit 6 acquires the transmission data from the corresponding transmission queue 14 of the transmission data management unit 10, and transmits the acquired transmission data to the network 5.

On the other hand, when the transmission instruction has arrived from the retransmission management unit 11, the data transmission unit 6 transmits to the network 5, the transmission data which has arrived together with the transmission instruction from the retransmission management unit 11. Besides, the transmission of the transmission data based on the transmission instruction from the retransmission management unit 11 corresponds to the retransmission of the transmission data.

When the transmission of the transmission data has been completed, in step S11, the data transmission unit 6 calculates a retransmission time of the transmission data based on the time when the transmission of the transmission data has been completed. Then, the data transmission unit 6 notifies the retransmission management unit 11 of the calculated retransmission time, and the memory address and the sequence number of the transmission data.

The data transmission unit 6 decides a time within the transmission time slot as the retransmission time. For example, a case is assumed in which the data transmission unit 6 has completed the transmission of the transmission data at 0 hour:0 minute:0 second. Further, here, a setting is assumed such that the transmission data is resent 10 seconds after the time when the transmission of the transmission data has been completed. In this case, if 0 hour:0 minute:10 seconds is the time within the transmission time slot, the data transmission unit 6 decides 0 hour:0 minute:10 seconds as the retransmission time. On the other hand, if 0 hour:0 minute:10 seconds is not the time within the transmission time slot, the data transmission unit 6 decides a time within the transmission time slot that comes earliest after 0 hour:0 minute:10 seconds, as the retransmission time.

Then, the data transmission unit 6 returns to step S8.

Next, an operation example of the retransmission management unit 11 will be described with reference to FIG. 8.

First, in step S12, the retransmission management unit 11 waits for a predetermined time.

Next, in step S13, the retransmission management unit 11 checks whether or not a retransmission time of a first entry in the retransmission data list 13 has come.

If the retransmission time has come, the retransmission management unit 11 proceeds to step S14. On the other hand, if the retransmission time has not come, the retransmission management unit 11 proceeds to step S15.

In step S14, the retransmission management unit 11 acquires the transmission data based on the memory address indicated in the first entry in the retransmission data list 13, and instructs the data transmission unit 6 to transmit the transmission data.

More specifically, the retransmission management unit 11 outputs the transmission instruction of the transmission data and the transmission data to the data transmission unit 6.

As a result of the transmission instruction and the transmission data being output in step S14, YES is acquired in step S9 of FIG. 7. Then, the data transmission unit 6 retransmits the transmission data in step S10.

In step S15, the retransmission management unit 11 checks whether or not a notification has arrived from the data transmission unit 6 or the data reception unit 8.

If the notification has arrived, the retransmission management unit 11 proceeds to step S16. On the other hand, if the notification has not arrived, the retransmission management unit 11 returns to step S12.

In step S16, the retransmission management unit 11 checks which of the notification from the data transmission unit 6 and the notification from the data reception unit 8 has arrived.

If the notification from the data transmission unit 6 has arrived, the retransmission management unit 11 proceeds to step S17. On the other hand, if the notification from the data reception unit 8 has arrived, the retransmission management unit 11 proceeds to step S18.

In step S17, the retransmission management unit 11 adds a new entry to the retransmission data list 13.

The notification from the data transmission unit 6 is the notification of the retransmission time, and the memory address and the sequence number of the transmission data described in step S11 of FIG. 7. In step S17, the retransmission management unit 11 adds to the retransmission data list 13, the new entry indicating the retransmission time, and the memory address and the sequence number of the transmission data which are notified by the data transmission unit 6. The retransmission management unit 11 adds the new entry to the retransmission data list 13 according to a retransmission time order. Thus, the retransmission of the transmission data is registered.

After the new entry is added to the retransmission data list 13, the retransmission management unit 11 returns to step S15.

In step S18, the retransmission management unit 11 deletes an entry from the retransmission data list 13.

The notification from the data reception unit 8 is a notification that the ACK data has been received from a transmission destination of the transmission data. The notification from the data reception unit 8 indicates the sequence number of the transmission data for which the ACK data has been received. Therefore, the retransmission management unit 11 deletes an entry for the transmission data for which the ACK data has been received, from the entries in the retransmission data list 13 based on the sequence number indicated in the notification from the data reception unit 8.

After deleting the entry from the retransmission data list 13, the retransmission management unit 11 returns to step S15.

The retransmission management unit 11 repeats steps S16 to S18 until processing all of the notifications from the data transmission unit 6 and the data reception unit 8. When all of the notifications from the data transmission unit 6 and the data reception unit 8 are processed, the retransmission management unit 11 returns to step S12.

Figure 9:
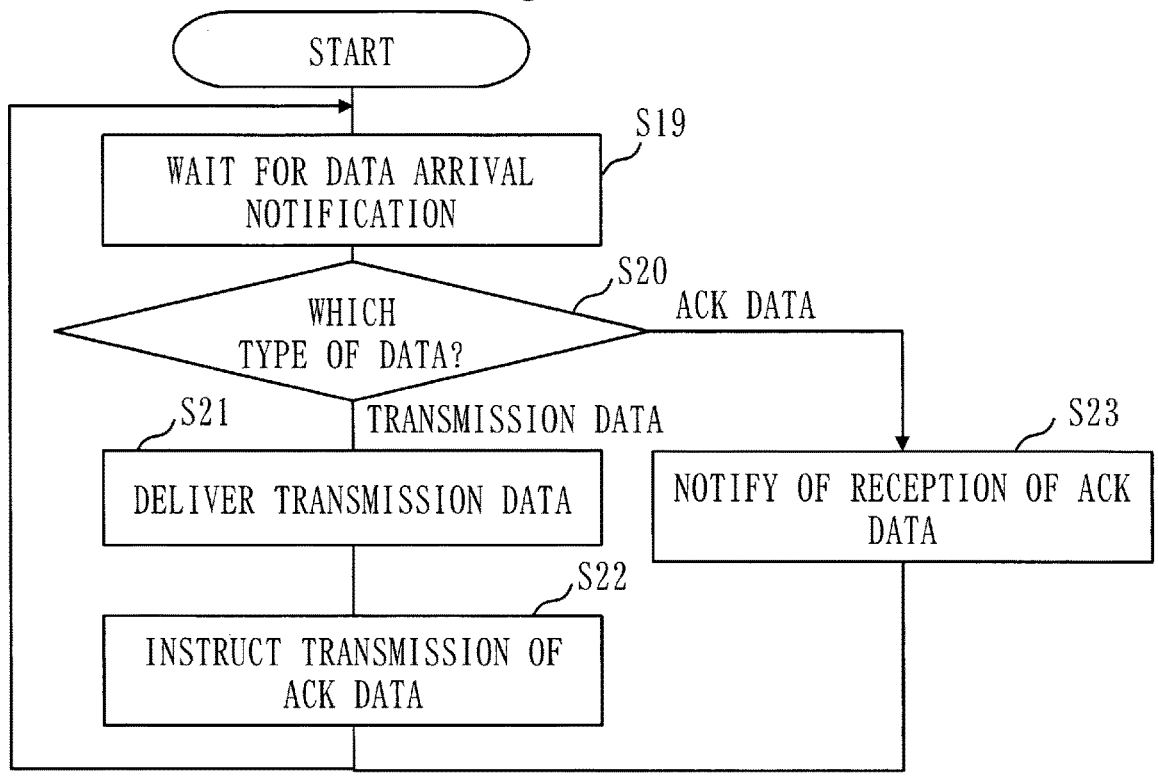
FIG. 9 is a flowchart illustrating an operation example of a data reception unit according to the first embodiment.

Next, an operation example of the data reception unit 8 will be described with reference to FIG. 9.

First, in step S19, the data reception unit 8 waits for a data arrival notification from the network interface 4. The data arrival notification is implemented by, for example, a hardware interrupt.

When the data arrival notification arrives, in step S20, the data reception unit 8 checks a type of received data. That is, the data reception unit 8 checks whether the received data is the transmission data transmitted from the communication device 102 or the communication device 103, or the ACK data transmitted from the communication device 102 or the communication device 103.

If the received data is the transmission data, the data reception unit 8 proceeds to step S21. On the other hand, if the received data is the ACK data, the data reception unit 8 proceeds to step S23.

In step S21, the data reception unit 8 delivers the transmission data to the reception application 16.

Also, in step S22, the data reception unit 8 instructs the ACK data generation unit 9 to transmit the ACK data for the received transmission data to a transmitter of the transmission data.

Then, the data reception unit 8 returns to step S19 and waits for an arrival of a next data arrival notification.

In step S23, the data reception unit 8 notifies the retransmission management unit 11 that the ACK data has been received. More specifically, the data reception unit 8 notifies of the sequence number of the transmission data for which the ACK data has been received.

Then, the data reception unit 8 returns to step S19 and waits for the arrival of the next data arrival notification.

Figure 10:
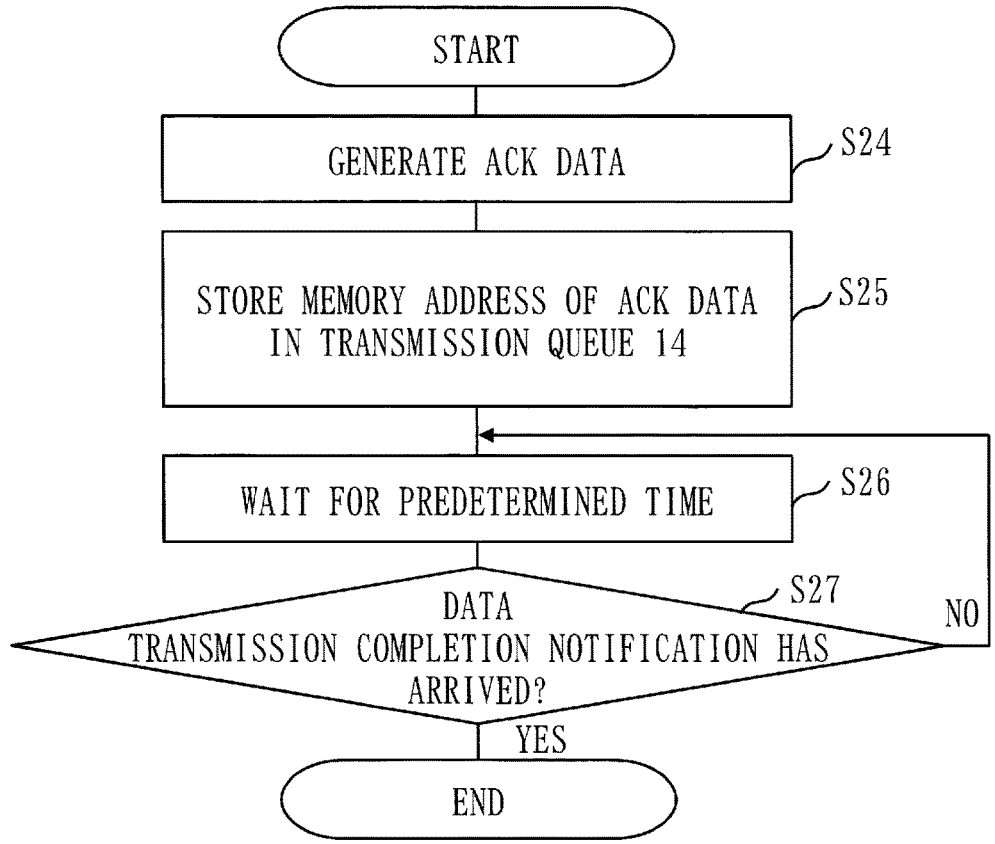
FIG. 10 is a flowchart illustrating an operation example of an ACK data generation unit according to the first embodiment.

Next, an operation example of the ACK data generation unit 9 will be described with reference to FIG. 10.

First, in step S24, the ACK data generation unit 9 generates the ACK data according to the instruction from the data reception unit 8.

Next, in step S25, the ACK data generation unit 9 stores a memory address of the ACK data generated in step S24 in a corresponding transmission queue 14.

That is, the ACK data generation unit 9 stores the memory address of the ACK data generated in step S24 in the transmission queue 14 of an entry of a time slot corresponding to a protocol of the ACK data, among the plurality of transmission queues 14 managed by the transmission data management unit 10.

Next, the ACK data generation unit 9 waits for a predetermined time in step S26.

Next, in step S27, the ACK data generation unit 9 checks whether or not the data transmission completion notification has arrived from the data transmission unit 6.

If the data transmission completion notification has not arrived, the ACK data generation unit 9 repeats steps S26 and S27 until the data transmission completion notification arrives.

When the data transmission completion notification arrives, the ACK data generation unit 9 ends the process.

An operation of the transmission application 15 is only to output the content to the transmission control unit 12.

Further, an operation of the reception application 16 is only to acquire from the data reception unit 8, the received data and perform a process particular to the reception application 16 on the data.

Thus, descriptions of processing procedures of the transmission application 15 and the reception application 16 are omitted.

\*\*\*Description of Effect of Embodiment\*\*\*

In a conventional method, the retransmission time is decided based on the time (the time of step S2 in FIG. 5) when the transmission control unit 12 stores the memory address of the transmission data in the transmission queue 14. Therefore, if the transmission data is stored in the transmission queue 14 during a time slot other than the transmission time slot, the retransmission time comes before the transmission time slot comes. Thus, there is a possibility that the transmission data is retransmitted at a same time as the first transmission of the transmission data. Further, even in a case in which the retransmission time comes after the first transmission of the transmission data, if the retransmission time comes immediately after the first transmission of the transmission data, the transmission data is retransmitted before the communication device on the receiving side transmits the ACK data. In any case, although the transmission data reaches the communication device on the receiving side, the transmission data is wastefully retransmitted.

In the present embodiment, the retransmission time is decided (step S11 in FIG. 7) based on the time (the time of step S10 in FIG. 7) when the data transmission unit 6 completes the transmission of the transmission data. Therefore, in the present embodiment, the transmission data is not retransmitted at the same time as the first transmission of the transmission data. Further, in the present embodiment, the retransmission time does not come immediately after the first transmission of the transmission data.

In this way, in the present embodiment, it is possible to prevent a wasteful retransmission in a configuration in which data is transmitted by switching types of data to be transmitted by a unit of a time slot, such as TSN.

Second Embodiment

In the present embodiment, when the current time slot is not the transmission time slot and a waiting time until the next transmission time slot is less than or equal to a threshold time, the communication device 101 transmits the transmission data in the same manner as the first embodiment. On the other hand, when the waiting time until the next transmission time slot is longer than the threshold time, the communication device 101 transmits the transmission data in accordance with the procedure of retransmitting the transmission data.

Below, a retransmission interval is treated as the threshold time. The retransmission interval is a default value predetermined in the communication device 101 as an interval from the first transmission of the transmission data until the retransmission.

\*\*\*Description of Configuration\*\*\*

Also, in the present embodiment, a configuration example of the communication system is the same as that illustrated in FIG. 1.

Figure 11:
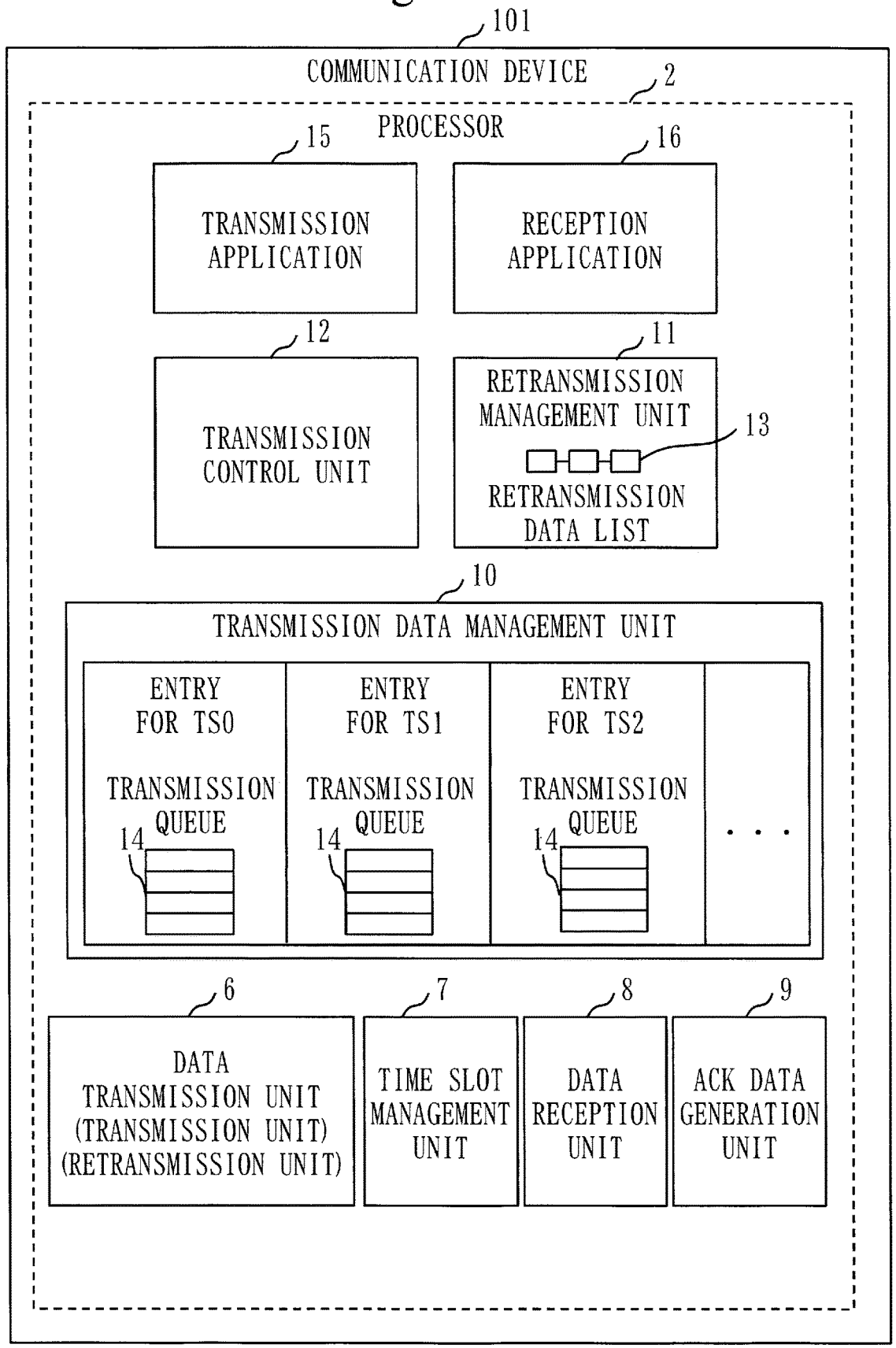
FIG. 11 is a diagram illustrating a functional configuration example of a communication device according to a second embodiment.

FIG. 11 illustrates a functional configuration example of the communication device 101 according to the present embodiment.

The functional configuration example of the communication device 101 illustrated in FIG. 11 is the same as that illustrated in FIG. 2, but in the present embodiment, the data transmission unit 6 corresponds to the transmission unit and a retransmission unit. Further, the process performed by the data transmission unit 6 corresponds to the transmission process and a retransmission process.

\*\*\*Description of Operation\*\*\*

Next, an operation example of the communication device 101 according to the present embodiment will be described. Also, in the present embodiment, the communication device 102 and the communication device 103 perform the same operation as the communication device 101.

In the present embodiment, differences from the first embodiment will be mainly described.

Besides, matters not described below are the same as those in the first embodiment.

Figure 12:
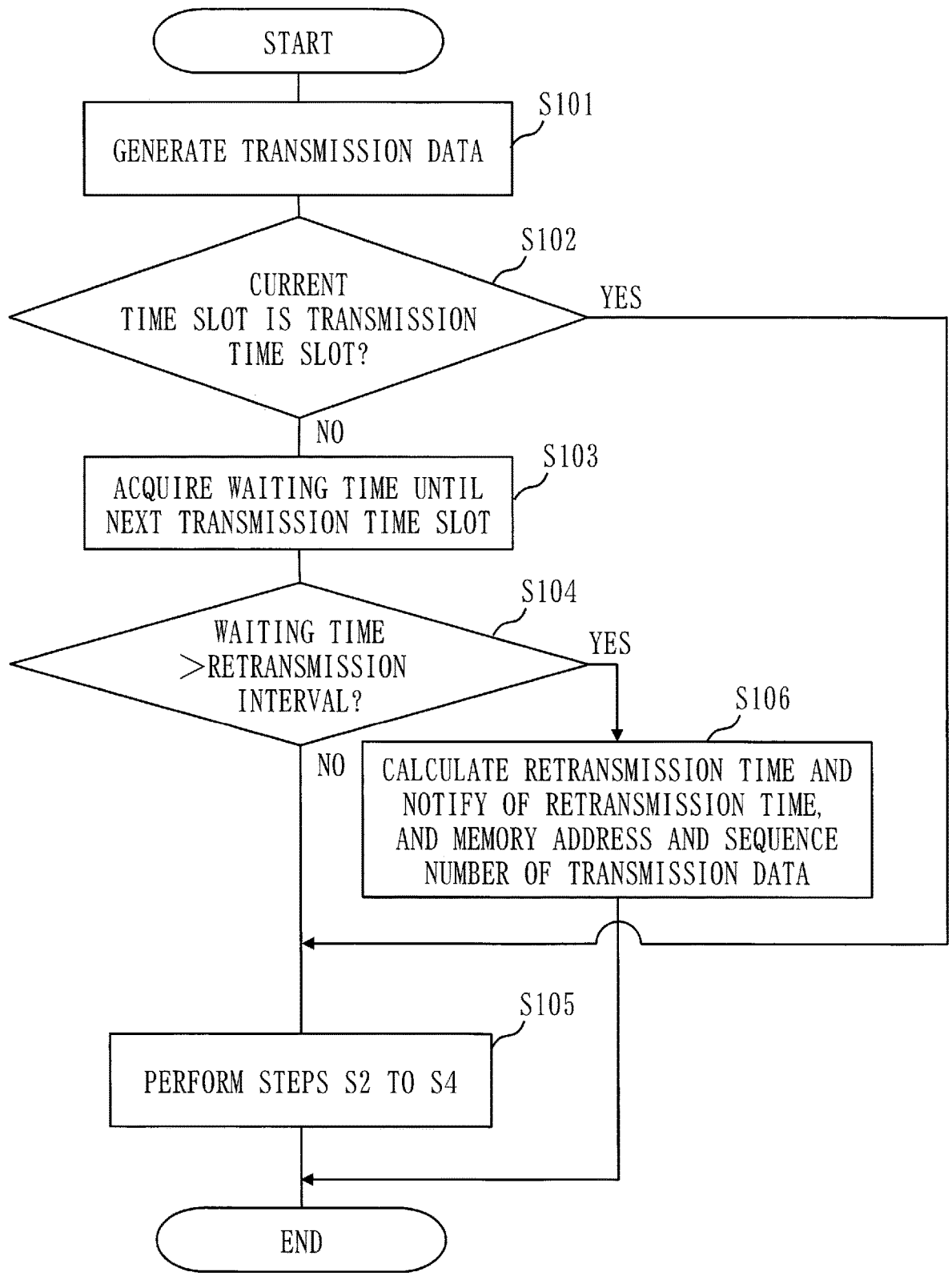
FIG. 12 is a flowchart illustrating an operation example of a transmission control unit according to the second embodiment.

FIG. 12 illustrates an operation example of the transmission control unit 12 according to the present embodiment.

In step S101, the transmission control unit 12 generates transmission data.

Since step S101 is the same as step S1 described in the first embodiment, detailed descriptions are omitted.

Next, in step S102, the transmission control unit 12 checks whether or not a current time slot is the transmission time slot. That is, the transmission control unit 12 determines whether or not the current time slot is a time slot for which a transmission of the transmission data is permitted.

If the current time slot is the transmission time slot, the transmission control unit 12 proceeds to step S105.

On the other hand, if the current time slot is not the transmission time slot, the transmission control unit 12 proceeds to step S103.

In step S103, the transmission control unit 12 acquires the waiting time until the next transmission time slot. Specifically, the transmission control unit 12 acquires the waiting time until the next transmission time slot by using a time allocated for the time slot (predetermined value) and a time elapsed from a beginning of the current time slot.

In step S104, the transmission control unit 12 compares the waiting time until the next transmission time slot which is acquired in step S103, with the retransmission interval.

If the waiting time until the next transmission time slot is less than or equal to the retransmission interval, the transmission control unit 12 proceeds to step S105.

On the other hand, if the waiting time until the next transmission time slot is longer than the retransmission interval, the transmission control unit 12 proceeds to step S106.

In step S105, the transmission control unit 12 performs the processes of steps S2 to S4 in FIG. 5.

That is, the transmission control unit 12 stores the memory address of the transmission data generated in step S101 in a corresponding transmission queue 14 (step S2).

Further, the transmission control unit 12 waits for the predetermined time (step S3), and checks whether or not the data transmission completion notification has arrived from the data transmission unit 6 (step S4).

If the data transmission completion notification has not arrived, the transmission control unit 12 repeats steps S3 and S4 until the data transmission completion notification arrives.

When the data transmission completion notification arrives, the transmission control unit 12 ends the process.

Figure 13:
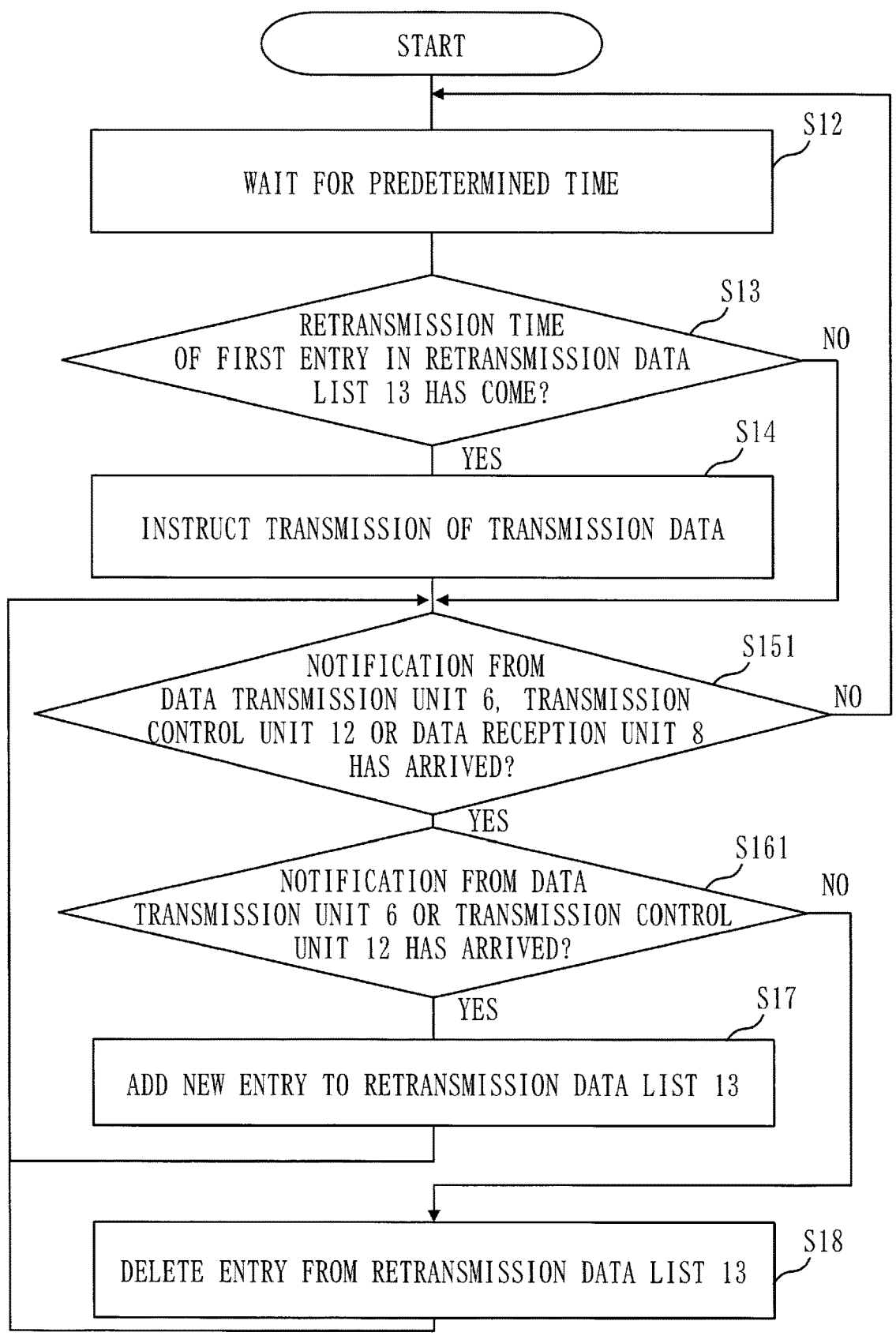
FIG. 13 is a flowchart illustrating an operation example of a retransmission management unit according to the second embodiment.

When the transmission control unit 12 performs steps S2 to S4, the data transmission unit 6 transmits the transmission data during the next transmission time slot, and decides the retransmission time in the next transmission time slot (FIG. 7). Then, the retransmission management unit 11 registers the retransmission of the transmission data at the retransmission time in the next transmission time slot (FIG. 13 explained later).

In this way, in the present embodiment, when the waiting time until the next transmission time slot is less than or equal to the retransmission interval, the transmission control unit 12 causes the data transmission unit 6 to transmit the transmission data during the next transmission time slot. Further, the transmission control unit 12 causes the data transmission unit 6 to decide the retransmission time in the next transmission time slot. Further, the transmission control unit 12 causes the retransmission management unit 11 to register the retransmission of the transmission data at the retransmission time in the next transmission time slot. Such control by the transmission control unit 12 is referred to as a first transmission control.

In step S106, the transmission control unit 12 calculates the retransmission time of the transmission data, and notifies the retransmission management unit 11 of the calculated retransmission time, and the memory address and the sequence number of the transmission data.

The transmission control unit 12 decides a time in the next transmission time slot as the retransmission time.

As will be described later, the retransmission management unit 11 registers the retransmission time, and the memory address and the sequence number of the transmission data notified in step S106, in the retransmission data list 13 as a new entry. As a result, the data transmission unit 6 transmits the transmission data during the next transmission time slot according to the retransmission data list 13.

In this way, in the present embodiment, when the waiting time until the next transmission time slot is longer than the retransmission interval, the transmission control unit 12 causes the retransmission management unit 11 to register the retransmission of the transmission data during the next transmission time slot. Then, the transmission control unit 12 causes the data transmission unit 6 to transmit the transmission data during the next transmission time slot. Such control by the transmission control unit 12 is referred to as a second transmission control.

Besides, when step S106 is performed, the transmission control unit 12 instructs the data transmission unit 6 not to decide the retransmission time in step S11.

FIG. 13 illustrates an operation example of the retransmission management unit 11 according to the present embodiment.

Figure 8:
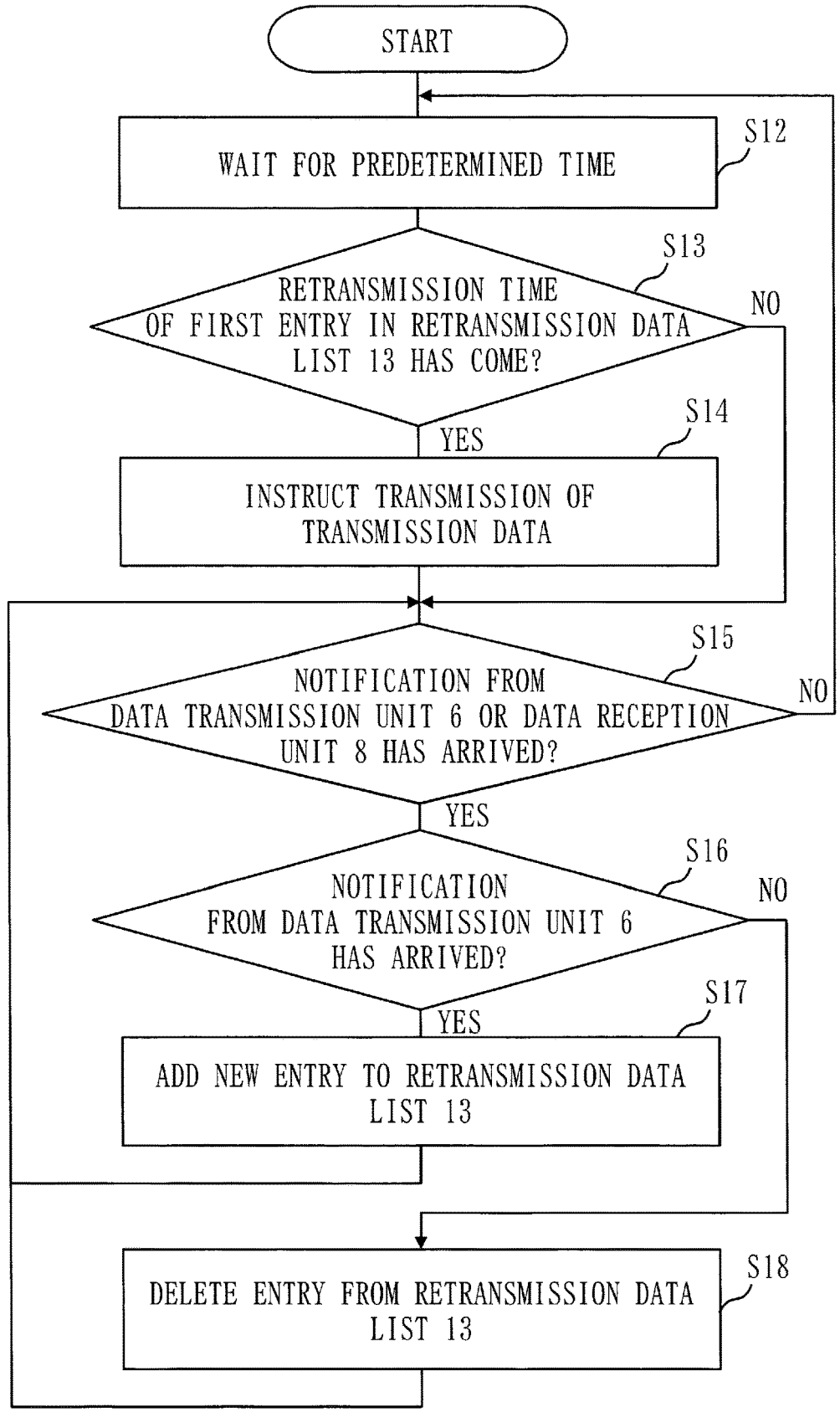
FIG. 8 is a flowchart illustrating an operation example of a retransmission management unit according to the first embodiment.

In FIG. 13, processes other than steps S151 and S161 are the same as those illustrated in FIG. 8. Therefore, only steps S151 and S161 will be described below.

In step S151, the retransmission management unit 11 checks whether or not the notification has arrived from the data transmission unit 6, the transmission control unit 12, or the data reception unit 8.

If the notification has arrived, the retransmission management unit 11 proceeds to step S161. On the other hand, if the notification has not arrived, the retransmission management unit 11 returns to step S12.

In step S161, the retransmission management unit 11 checks which of the notification from the data transmission unit 6 or the transmission control unit 12, or the notification from the data reception unit 8 has arrived.

If the notification from the data transmission unit 6 or the transmission control unit 12 has arrived, the retransmission management unit 11 proceeds to step S17. On the other hand, if the notification from the data reception unit 8 has arrived, the retransmission management unit 11 proceeds to step S18.

The notification from the transmission control unit 12 is the notification of step S106 in FIG. 12. That is, also when the notification of step S106 has been received from the transmission control unit 12, the retransmission management unit 11 adds the new entry to the retransmission data list 13 based on the notification from the transmission control unit 12, as with the notification from the data transmission unit 6.

Description of Effect of Embodiment

In the present embodiment, when the current time slot is not the transmission time slot and the waiting time until the next transmission time slot is longer than the threshold time (retransmission interval), the first transmission of the transmission data is performed in accordance with the retransmission procedure. Therefore, according to the present embodiment, when the waiting time until the next transmission time slot is longer than the threshold time (retransmission interval), the procedure such as storing the transmission data in the transmission queue 14 can be omitted. Thus, a processing load can be lowered. That is, according to the present embodiment, more efficient data transmission can be realized.

Further, it is possible to perform a retransmission process of the data at a time closer to a retransmission time of the conventional technique.

Besides, although the threshold time is the retransmission interval in the above, it is acceptable if the threshold time is not the retransmission interval.

Third Embodiment

In the present embodiment, when the current time slot is the transmission time slot, and a remaining time in the current time slot is longer than a threshold time, the communication device 101 selects a transmission of the transmission data during the current time slot. On the other hand, when the remaining time in the current time slot is less than or equal to the threshold time, the communication device 101 selects a transmission of the transmission data for the next transmission time slot.

In the present embodiment, a transmission required time is used as the threshold time. The transmission required time is a time required for the data transmission unit 6 to transmit the transmission data.

\*\*\*Description of Configuration\*\*\*

Also, in the present embodiment, a configuration example of the communication system is the same as that illustrated in FIG. 1.

Further, also, in the present embodiment, a functional configuration of the communication device 101 is the same as that illustrated in FIG. 11.

\*\*\*Description of Operation\*\*\*

Next, an operation example of the communication device 101 according to the present embodiment will be described. Also, in the present embodiment, the communication device 102 and the communication device 103 perform the same operation as the communication device 101.

In the present embodiment, differences from the first embodiment will be mainly described.

Besides, matters not described below are the same as those in the first embodiment.

Figure 14:
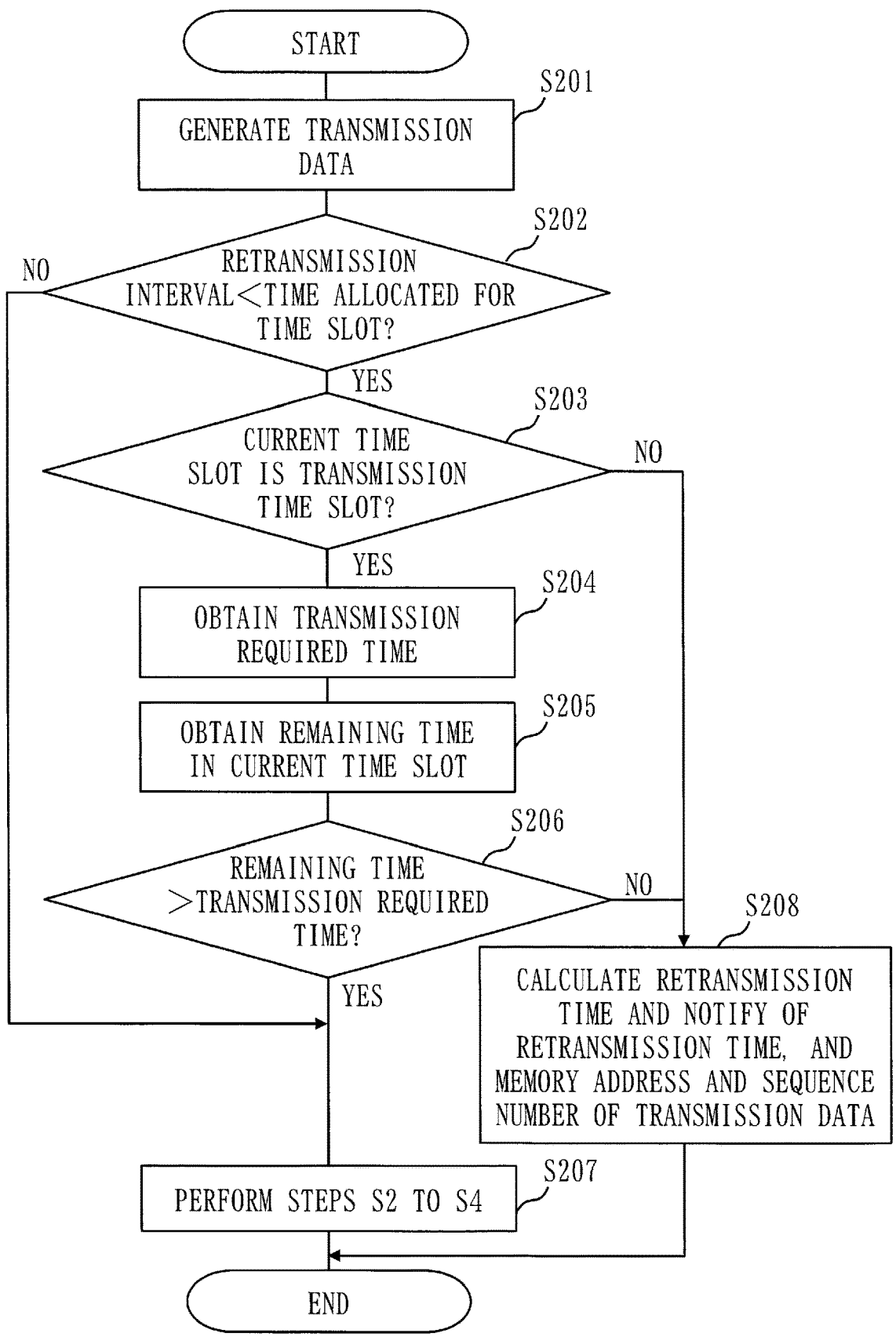
FIG. 14 is a flowchart illustrating an operation example of a transmission control unit according to a third embodiment.

FIG. 14 illustrates an operation example of the transmission control unit 12 according to the present embodiment.

In step S201, the transmission control unit 12 generates transmission data.

Since step S201 is the same as step S1 described in the first embodiment, detailed descriptions are omitted.

Next, in step S202, the transmission control unit 12 compares a retransmission interval with a time allocated for the time slot.

If the time allocated for the time slot is longer than the retransmission interval, the transmission control unit 12 proceeds to step S203. On the other hand, if the time allocated for the time slot is less than or equal to the retransmission interval, the transmission control unit 12 proceeds to step S207.

In step S203, the transmission control unit 12 checks whether or not a current time slot is the transmission time slot. That is, the transmission control unit 12 determines whether or not the current time slot is a time slot for which the transmission of the transmission data is permitted.

If the current time slot is the transmission time slot, the transmission control unit 12 proceeds to step S204.

On the other hand, if the current time slot is not the transmission time slot, the transmission control unit 12 proceeds to step S208.

In step S204, the transmission control unit 12 obtains the transmission required time. That is, the transmission control unit 12 checks a time required to process steps S10 and S11 in FIG. 7. For example, it is conceivable that the data transmission unit 6 measures the time required for steps S10 and S11, keeps the time as the transmission required time, and notifies the transmission control unit 12 of the transmission required time.

In step S205, the transmission control unit 12 obtains the remaining time in the current time slot.

In step S206, the transmission control unit 12 compares the transmission required time with the remaining time in the current time slot.

If the remaining time in the current time slot is longer than the transmission required time, the transmission control unit 12 proceeds to step S207. On the other hand, if the remaining time in the current time slot is less than or equal to the transmission required time, the transmission control unit 12 proceeds to step S208.

In step S207, the transmission control unit 12 performs the processes of steps S2 to S4 in FIG. 5.

That is, the transmission control unit 12 stores the memory address of the transmission data generated in step S101 in the corresponding transmission queue 14 (step S2).

In addition, the transmission control unit 12 waits for the predetermined time (step S3), and checks whether or not the data transmission completion notification has arrived from the data transmission unit 6 (step S4).

If the data transmission completion notification has not arrived, the transmission control unit 12 repeats steps S3 and S4 until the data transmission completion notification arrives.

When the data transmission completion notification arrives, the transmission control unit 12 ends the process.

When the transmission control unit 12 performs steps S2 to S4, the data transmission unit 6 transmits the transmission data during the next transmission time slot, and decides the retransmission time in the next transmission time slot (FIG. 7). Then, the retransmission management unit 11 registers the retransmission of the transmission data at the retransmission time in the next transmission time slot (FIG. 13).

In this way, in the present embodiment, when the remaining time in the current time slot is longer than the transmission required time, the transmission control unit 12 causes the data transmission unit 6 to transmit the transmission data during the next transmission time slot. Further, the transmission control unit 12 causes the data transmission unit 6 to decide the retransmission time in the next transmission time slot. Further, the transmission control unit 12 causes the retransmission management unit 11 to register the retransmission of the transmission data at the retransmission time in the next transmission time slot. Such control by the transmission control unit 12 is referred to as a first transmission control.

In step S208, the transmission control unit 12 calculates the retransmission time of the transmission data, and notifies the retransmission management unit 11 of the calculated retransmission time, and the memory address and the sequence number of the transmission data.

The transmission control unit 12 decides a time in the next transmission time slot as the retransmission time.

Also, in the present embodiment, the retransmission management unit 11 registers the retransmission time, and the memory address and the sequence number of the transmission data notified in step S208 in the retransmission data list 13 as a new entry. As a result, the data transmission unit 6 transmits the transmission data during the next transmission time slot according to the retransmission data list 13.

In this way, in the present embodiment, when the remaining time in the current time slot is less than or equal to the transmission required time, the transmission control unit 12 causes the retransmission management unit 11 to register the retransmission of the transmission data during the next transmission time slot. Further, the transmission control unit 12 causes the data transmission unit 6 to transmit the transmission data during the next transmission time slot. Such control by the transmission control unit 12 is referred to as a second transmission control.

Besides, if step S208 is performed, the transmission control unit 12 instructs the data transmission unit 6 not to decide the retransmission time in step S11.

Also, in the present embodiment, an operation of the retransmission management unit 11 is as illustrated in FIG. 13.

Description of Effect of Embodiment

In the method of the first embodiment, the communication device 101 performs the transmission process of the transmission data even if the current time slot is the transmission time slot and the remaining time in the current time slot is less than or equal to the transmission required time. However, in this case, since the communication device 101 cannot transmit the transmission data within the current time slot, the transmission process performed during the current time slot becomes wasteful.

Therefore, in the present embodiment, when the remaining time in the current time slot is less than or equal to the transmission required time, the communication device 101 does not transmit the transmission data during the current time slot, but transmits the transmission data during the next transmission time slot. As a result, according to the present embodiment, it is possible to perform an efficient data transmission.

Fourth Embodiment

Also, in the present embodiment, as with the third embodiment, when the current time slot is the transmission time slot and the remaining time in the current time slot is longer than the threshold time, the communication device 101 selects the transmission of the transmission data during the current time slot. On the other hand, when the remaining time in the current time slot is less than or equal to the threshold time, the communication device 101 selects a transmission of the transmission data for the next transmission time slot.

In the present embodiment, a reception confirmation required time is used as the threshold time. The reception confirmation required time is a time required from the transmission of the transmission data until receiving a reception confirmation (ACK data) for the transmission data from the transmission destination of the transmission data.

*Description of Configuration*

Also, in the present embodiment, a configuration example of the communication system is the same as that illustrated in FIG. 1.

Further, also, in the present embodiment, a functional configuration of the communication device 101 is the same as that illustrated in FIG. 11.

*Description of Operation*

Next, an operation example of the communication device 101 according to the present embodiment will be described. Also, in the present embodiment, the communication device 102 and the communication device 103 perform the same operation as the communication device 101.

In the present embodiment, differences from the first embodiment will be mainly described.

Besides, matters not described below are the same as those in the first embodiment.

Figure 15:
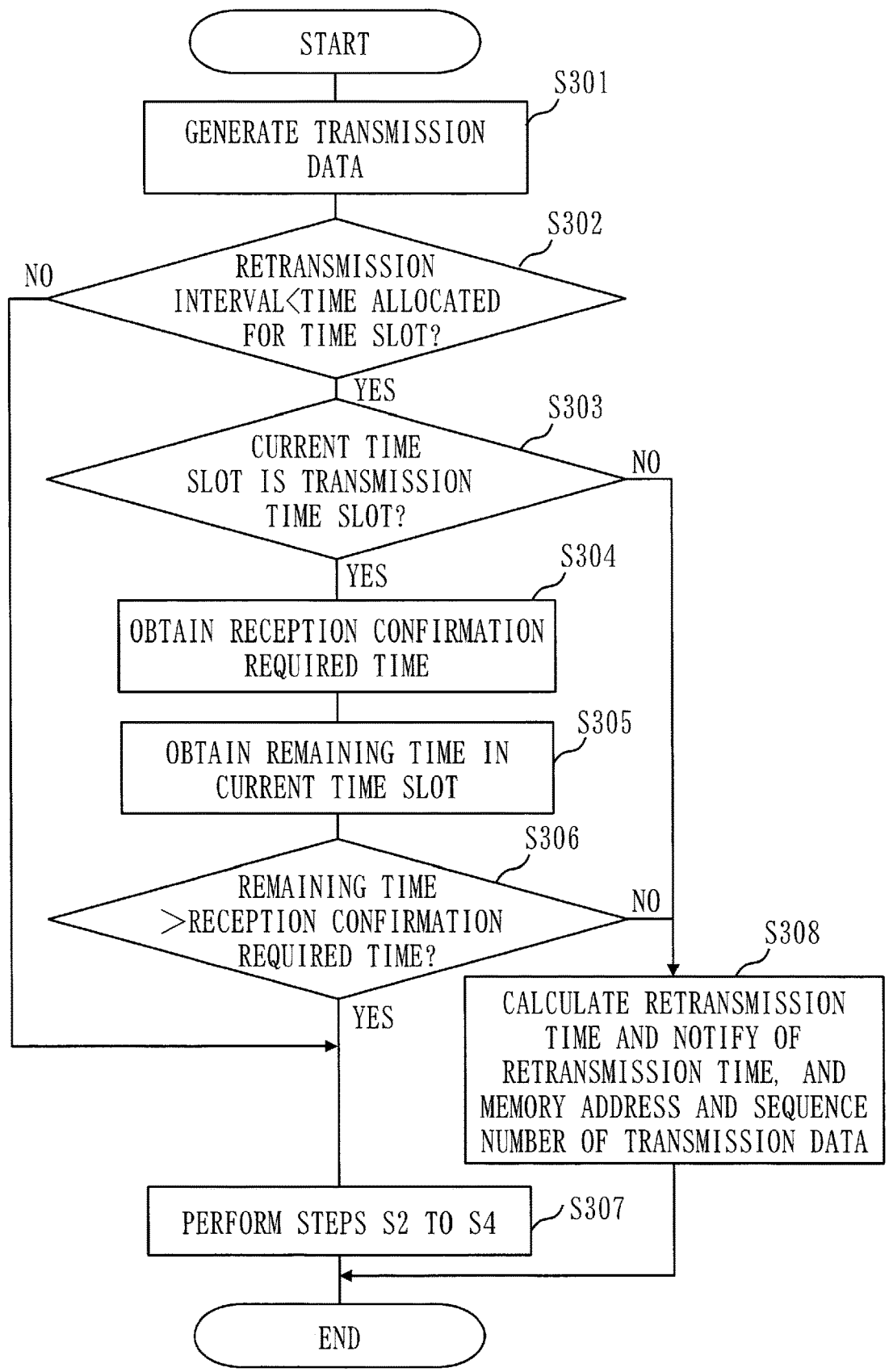
FIG. 15 is a flowchart illustrating an operation example of a transmission control unit according to a fourth embodiment.
Figure 16:
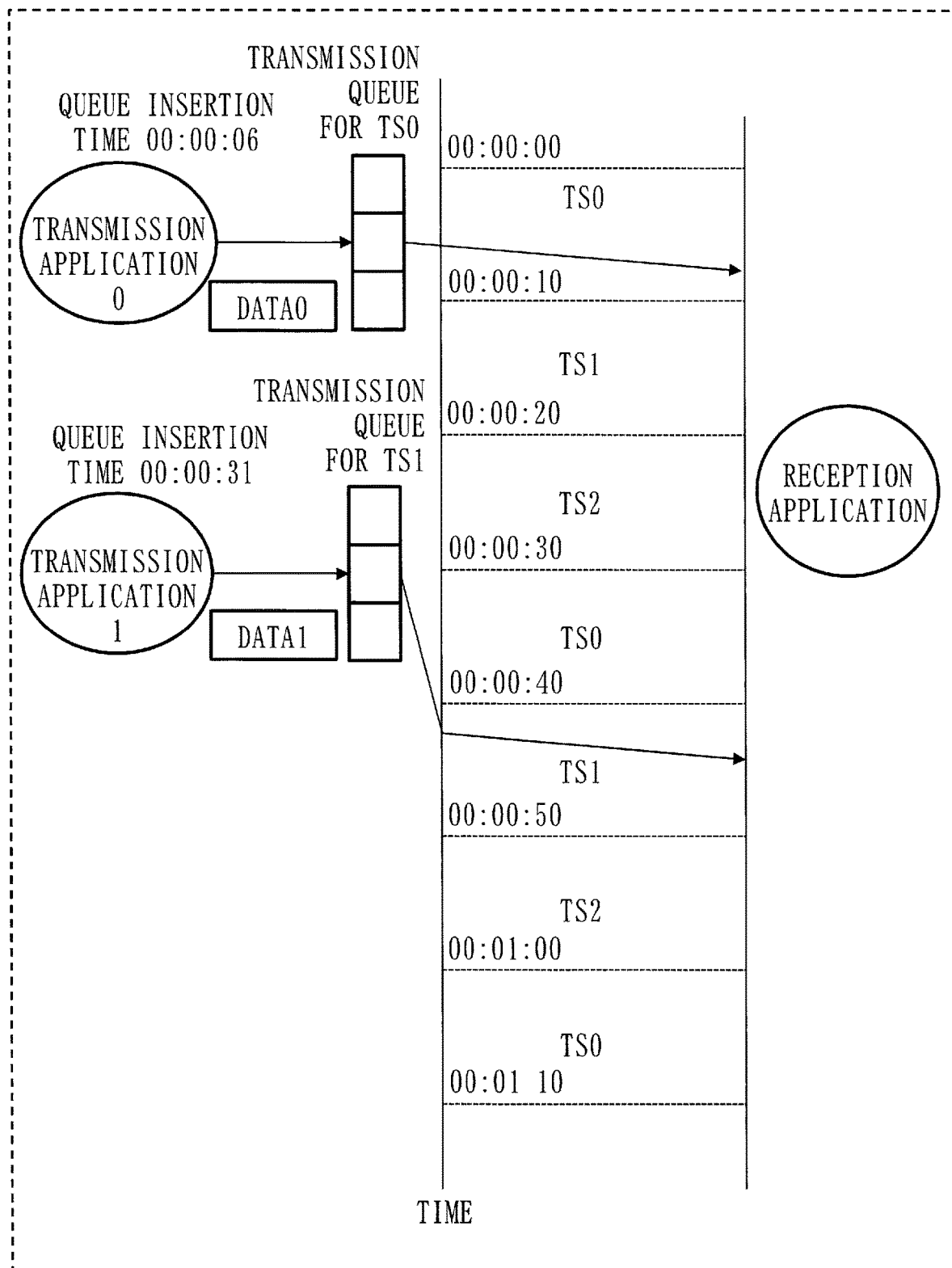
FIG. 16 is a diagram illustrating a communication sequence in TSN.

FIG. 15 illustrates an operation example of the transmission control unit 12 according to the present embodiment.

In step S301, the transmission control unit 12 generates transmission data.

Since step S301 is the same as step S1 described in the first embodiment, detailed descriptions are omitted.

Next, in step S302, the transmission control unit 12 compares the retransmission interval with the time allocated for the time slot.

If the time allocated for the time slot is longer than the retransmission interval, the transmission control unit 12 proceeds to step S303. On the other hand, if the time allocated for the time slot is less than or equal to the retransmission interval, the transmission control unit 12 proceeds to step S307.

In step S303, the transmission control unit 12 checks whether or not a current time slot is the transmission time slot. That is, the transmission control unit 12 determines whether or not the current time slot is a time slot for which the transmission of the transmission data is permitted.

If the current time slot is the transmission time slot, the transmission control unit 12 proceeds to step S304.

On the other hand, if the current time slot is not the transmission time slot, the transmission control unit 12 proceeds to step S308.

In step S304, the transmission control unit 12 obtains the reception confirmation required time. For example, the data transmission unit 6 transmits the transmission data, and measures as the reception confirmation required time, a time from the transmission of the transmission data until receiving the ACK data in the same time slot from the communication device on the receiving side. Then, it is conceivable that the data transmission unit 6 notifies the transmission control unit 12 of the reception confirmation required time. The data transmission unit 6 may notify the transmission control unit 12 of the reception confirmation required time measured in the past.

In step S305, the transmission control unit 12 obtains the remaining time in the current time slot.

In step S306, the transmission control unit 12 compares the reception confirmation required time with the remaining time in the current time slot.

If the remaining time in the current time slot is longer than the reception confirmation required time, the transmission control unit 12 proceeds to step S307. On the other hand, if the remaining time in the current time slot is less than or equal to the reception confirmation required time, the transmission control unit 12 proceeds to step S308.

In step S307, the transmission control unit 12 performs the processes of steps S2 to S4 in FIG. 5.

That is, the transmission control unit 12 stores the memory address of the transmission data generated in step S101 in the corresponding transmission queue 14 (step S2).

In addition, the transmission control unit 12 waits for the predetermined time (step S3), and checks whether or not the data transmission completion notification has arrived from the data transmission unit 6 (step S4).

If the data transmission completion notification has not arrived, the transmission control unit 12 repeats steps S3 and S4 until the data transmission completion notification arrives.

When the data transmission completion notification arrives, the transmission control unit 12 ends the process.

When the transmission control unit 12 performs steps S2 to S4, the data transmission unit 6 transmits the transmission data during the next transmission time slot, and decides the retransmission time in the next transmission time slot (FIG. 7). Then, the retransmission management unit 11 registers the retransmission of the transmission data at the retransmission time in the next transmission time slot (FIG. 13).

In this way, in the present embodiment, when the remaining time in the current time slot is longer than the reception confirmation required time, the transmission control unit 12 causes the data transmission unit 6 to transmit the transmission data during the next transmission time slot. Further, the transmission control unit 12 causes the data transmission unit 6 to decide the retransmission time in the next transmission time slot. Further, the transmission control unit 12 causes the retransmission management unit 11 to register the retransmission of the transmission data at the retransmission time in the next transmission time slot. Such control by the transmission control unit 12 is referred to as a first transmission control.

In step S308, the transmission control unit 12 calculates the retransmission time of the transmission data, and notifies the retransmission management unit 11 of the calculated retransmission time, and the memory address and the sequence number of the transmission data.

The transmission control unit 12 decides a time in the next transmission time slot as the retransmission time.

Also, in the present embodiment, the retransmission management unit 11 registers the retransmission time, and the memory address and the sequence number of the transmission data notified in step S308 in the retransmission data list 13 as a new entry. As a result, the data transmission unit 6 transmits the transmission data during the next transmission time slot according to the retransmission data list 13.

In this way, in the present embodiment, when the remaining time in the current time slot is less than or equal to the reception confirmation required time, the transmission control unit 12 causes the retransmission management unit 11 to register the retransmission of the transmission data during the next transmission time slot. Further, the transmission control unit 12 causes the data transmission unit 6 to transmit the transmission data during the next transmission time slot. Such control by the transmission control unit 12 is referred to as a second transmission control.

Besides, if step S308 is performed, the transmission control unit 12 instructs the data transmission unit 6 not to decide the retransmission time in step S11.

Also, in the present embodiment, an operation of the retransmission management unit 11 is as illustrated in FIG. 13.

Description of Effect of Embodiment

In the method of the first embodiment, the communication device 101 transmits the transmission data even if the current time slot is the transmission time slot and the remaining time in the current time slot is less than or equal to the reception confirmation required time. However, in this case, the ACK data does not arrive at the communication device 101 during the current time slot. Therefore, the retransmission time comes before the ACK data arrives at the communication device 101, and the communication device 101 retransmits the transmission data even though the transmission data has arrived at the communication device on the receiving side.

Then, in the present embodiment, when the remaining time in the current time slot is less than or equal to the reception confirmation required time, the communication device 101 does not transmit the transmission data during the current time slot, but transmits the transmission data during the next transmission time slot. As a result, in the present embodiment, it is possible to prevent a wasteful retransmission.

Besides, in the above description, as a method of acquiring the reception confirmation required time, the method of measuring the time from the transmission of the transmission data until return of the ACK data has been described. For this description, since in TCP/IP, a time when the transmission data arrives at the communication device on the receiving side cannot be stored in the ACK data, the above description explains an example of actually measuring the reception confirmation required time. If a protocol is used which can store in the ACK data, the time when the transmission data arrives at the communication device on the receiving side, the transmission control unit 12 can obtain the reception confirmation required time by doubling a time obtained by subtracting the time (the time when the transmission data has arrived at the communication device on the receiving side) stored in the ACK data from the time when the communication device 101 receives the ACK data, and by adding a processing time in the communication device on the receiving side to the time obtained by doubling.

Although the embodiments of the present invention have been described above, two or more of these embodiments may be combined and implemented.

Alternatively, one of these embodiments may be partially implemented.

Alternatively, two or more of these embodiments may be partially combined and implemented.

Besides, the present invention is not limited to these embodiments, and various modifications can be made as necessary.

\*\*\*Description of Hardware Configuration\*\*\*

Finally, supplementary descriptions of a hardware configuration of the communication device 101 will be given.

The processor 2 is an IC (Integrated Circuit) that performs processing.

The processor 2 is a CPU (Central Processing Unit), a DSP (Digital Signal Processor), or the like.

The memory 3 is a RAM (Random Access Memory), a ROM (Read Only Memory), a flash memory, an HDD (Hard Disk Drive), or the like.

The network interface 4 is an electronic circuit that transmits and receives data.

The network interface 4 is, for example, a communication chip or an NIC (Network Interface Card).

The memory 3 also stores an OS (Operating System).

Then, at least a part of the OS is executed by the processor 2.

The processor 2 executes a program that implements functions of the data transmission unit 6, the time slot management unit 7, the data reception unit 8, the ACK data generation unit 9, the retransmission management unit 11, and the transmission control unit 12 while executing at least the part of the OS.

Further, information, data, a signal value, or a variable value indicating processing results of the data transmission unit 6, the time slot management unit 7, the data reception unit 8, the ACK data generation unit 9, the retransmission management unit 11 and the transmission control unit 12, are stored in the memory 3, or a register or a cache memory in the processor 2.

Further, the program that implements the functions of the data transmission unit 6, the time slot management unit 7, the data reception unit 8, the ACK data generation unit 9, the retransmission management unit 11, and the transmission control unit 12 may be stored in a portable recording medium such as a magnetic disk, a flexible disk, an optical disk, a compact disk, a Blu-ray (registered trademark) disc, or a DVD.

In addition, the communication device 101 may be realized by an electronic circuit such as a logic IC (Integrated Circuit), a GA (Gate Array), an ASIC (Application Specific Integrated Circuit), or an FPGA (Field-Programmable Gate Array).

Besides, the processor and the electronic circuit described above are also collectively referred to as processing circuitry.

REFERENCE SIGNS LIST

2: processor, 3: memory, 4: network interface, 5: network, 101: communication device, 102: communication device, 103: communication device, 6: data transmission unit, 7: time slot management unit, 8: data reception unit, 9: ACK data generation unit, 10: transmission data management unit, 11: retransmission management unit, 12: transmission control unit, 13: retransmission data list, 14: transmission queue, 15: transmission application, 16: reception application.

The invention claimed is:

1. A communication device for transmitting and receiving transmission data in a time sensitive network, the communication device comprising:
a memory storing a retransmission data list, each entry in the retransmission data list including at least a retransmission time at which respective transmission data is to be transmitted and a memory address of the respective transmission data to be transmitted at the retransmission time; and
processing circuitry
to transmit the transmission data by switching types of data to be transmitted by a unit of a time slot;
to register retransmission of the transmission data by adding an entry to the retransmission data list including the retransmission time at which the respective transmission data is to be transmitted and the memory address of the respective transmission data to be transmitted at the retransmission time;
to retransmit the respective transmission data registered for retransmission in the retransmission data list; and
to, when the transmission data is received,
determine whether or not a current time slot is a transmission time slot corresponding to a type of the received transmission data,
compare, when the current time slot is not the transmission time slot, a waiting time until a next transmission time slot for the type of the received transmission data with a threshold time,
select based on a comparison result, one of a first transmission control and a second transmission control, and
perform the selected transmission control, wherein
the first transmission control causes the processing circuitry to transmit the received transmission data during the next transmission time slot corresponding to the type of the received transmission data and to register, after completion of the transmission of the received transmission data during the next transmission time slot, the retransmission of the received transmission data in the retransmission data list by entering a future time as the retransmission time and a memory address where the received transmission data is stored, and
the second transmission control causes the processing circuitry to calculate a retransmission time at which the received transmission data is to be transmitted during the next transmission time slot corresponding to the type of the received transmission data and register the retransmission of the received transmission data in the retransmission data list using the calculated retransmission time as the retransmission time and to transmit the received transmission data during the calculated retransmission time registered in the retransmission data list.

2. The communication device according to claim 1, wherein the processing circuitry
compares as the threshold time, a retransmission interval when the received transmission data is to be retransmitted, with the waiting time until the next transmission time slot corresponding to the type of the received transmission data,
selects the first transmission control when the waiting time is less than or equal to the retransmission interval, and
selects the second transmission control when the waiting time is longer than the retransmission interval.

3. A communication device comprising:
a memory storing a retransmission data list, each entry in the retransmission data list including at least a retransmission time at which respective transmission data is to be transmitted and a memory address of received transmission data to be transmitted at the retransmission time; and
processing circuitry
to transmit the received transmission data by switching types of data to be transmitted by a unit of a time slot; and to determine, when transmission data is received, whether or not a current time slot is a transmission time slot corresponding to a type of the received transmission data, to compare a remaining time in the current time slot with a threshold time when the current time slot is the transmission time slot corresponding to the type of the received transmission data, to transmit the received transmission data during the current time slot when the remaining time in the current time slot is longer than the threshold time, and to select one of a first transmission control and a second transmission control when the remaining time in the current time slot is less than or equal to the threshold time and performing the selected control, wherein the first transmission control causes the processing circuitry to transmit the received transmission data during a next transmission time slot corresponding to the type of the received transmission data and to register the retransmission of the received transmission data in the retransmission data list after completion of the transmission of the received transmission data during the next transmission time slot by adding an entry to the retransmission data list including a future time as a retransmission time at which the received transmission data is to be retransmitted and the memory address where the received transmission data to be retransmitted is stored, and the second transmission control causes the processing circuitry to calculate a retransmission time at which the received transmission data is to be transmitted during the next transmission time slot corresponding to the type of the received transmission data and register the retransmission of the received transmission data in the retransmission data list using the calculated retransmission time and to transmit the received transmission data during the calculated retransmission time registered in the retransmission data list.

4. The communication device according to claim 3, wherein the processing circuitry compares as the threshold time, a transmission required time which is required for the processing circuitry to transmit the transmission data, with the remaining time in the current time slot.

5. The communication device according to claim 3, wherein the processing circuitry compares as the threshold time, a reception confirmation required time until receiving a reception confirmation for the transmission data from a transmission destination of the transmission data, with the remaining time in the current time slot.

6. A communication method by a communication device which includes processing circuitry to transmit received transmission data by switching types of data to be transmitted by a unit of a time slot, to register a retransmission of received transmission data previously transmitted by adding an entry to a retransmission data list including a retransmission time at which the received transmission data is to be transmitted and a memory address of the received transmission data to be transmitted at the retransmission time, and to retransmit the received transmission data registered for the retransmission, the communication method, comprising:

determining, when transmission data is received, whether or not a current time slot is a transmission time slot corresponding to a type of the received transmission data;

comparing, when the current time slot is not the transmission time slot, a waiting time until a next transmission time slot for the type of the received transmission data with a threshold time;

selecting based on a comparison result, one of a first transmission control and a second transmission control; and performing the selected transmission control, wherein the first transmission control causes the processing circuitry to transmit the received transmission data during the next transmission time slot corresponding to the type of the received transmission data and to register, after completion of the transmission of the received transmission data during the next transmission time slot, the retransmission of the received transmission data in the retransmission data list by entering a future time as the retransmission time and the memory address where the received transmission data is stored, the second transmission control causes the processing circuitry to calculate a retransmission time at which the received transmission data is to be transmitted during the next transmission time slot corresponding to the type of the received transmission data and to register retransmission of the received transmission data in the retransmission data list using the calculated retransmission time as the retransmission time and to transmit the received transmission data during the calculated retransmission time registered in the retransmission data list.

7. A communication method by a communication device transmitting data by switching types of the data to be transmitted by a unit of a time slot, the communication method comprising:

determining, when transmission data is received, whether or not a current time slot is a transmission time slot corresponding to a type of the received transmission data;

comparing a remaining time in the current time slot with a threshold time when the current time slot is the transmission time slot for the type of the received data;

transmitting the received transmission data during the current time slot when the remaining time in the current time slot is longer than the threshold time, and selecting one of a first transmission control and a second transmission control when the remaining time in the current time slot is less than or equal to the threshold time and performing the selected control, wherein the first transmission control causes the processing circuitry to transmit the received transmission data during a next transmission time slot corresponding to the type of the received transmission data and to register retransmission of the received transmission data in a retransmission data list after completion of the transmission of the received transmission data during the next transmission time slot by entering a future time as a retransmission time at which the received transmission data is to be transmitted and a memory address where the received transmission data is stored, and the second transmission control causes the processing circuitry to calculate a retransmission time at which the received transmission data is to be transmitted in the next transmission time slot corresponding to the type of the received transmission data and register the retransmission of the received transmission data in the retransmission data list using the calculated retransmission time as the retransmission time of the received transmission data and to transmit the received transmission data during the registered retransmission time of the next transmission time slot.

8. A non-transitory computer readable medium storing a communication program which causes a communication device to execute:
a transmission process of transmitting transmission data by switching types of the transmission data to be transmitted by a unit of a time slot;
a retransmission management process of registering a retransmission of the transmission data transmitted by the transmission process;
a retransmission process of retransmitting the transmission data registered by the retransmission management process for the retransmission; and
a transmission control process of
determining, when the transmission data is received, whether or not a current time slot is a transmission time slot corresponding to a type of the received transmission data,
comparing a waiting time until a next transmission time slot with a threshold time when the current time slot is not the transmission time slot for the type of the received transmission data,
selecting based on a comparison result, one of a first transmission control and a second transmission control, and
performing the selected transmission control, wherein
the first transmission control causes the transmission process to transmit the received transmission data during the next transmission time slot corresponding to the type of the received transmission data and causes the retransmission management process to register retransmission of the received transmission data in a retransmission data list after completion of the transmission of the received transmission data during the next transmission time slot by adding an entry to the retransmission data list including a future time as a retransmission time at which the received transmission data is to be transmitted and a memory address where the received transmission data is stored, and
the second transmission control causes the retransmission management process to calculate a retransmission time at which the received transmission data is to be transmitted during the next transmission time slot corresponding to the type of the received transmission data and register the retransmission of the received transmission data in the retransmission data list using the calculated retransmission time as the retransmission time and causes the retransmission process to transmit the received transmission data during the calculated retransmission time registered in the retransmission data list.

9. A non-transitory computer readable medium storing a communication program which causes a communication device to transmit transmission data by switching types of the transmission data to be transmitted by a unit of a time slot, to execute
a transmission control process of
determining, when the transmission data is received, whether or not a current time slot is a transmission time slot corresponding to a type of the received transmission data,
comparing a remaining time in the current time slot with a threshold time when the current time slot is the transmission time slot for the type of the received transmission data,
transmitting the received transmission data during the current time slot when the remaining time in the current time slot is longer than the threshold time, and
selecting one of a first transmission control and a second transmission control when the remaining time in the current time slot is less than or equal to the threshold time, wherein
the first transmission control causes processing circuitry of the communication device to transmit the received transmission data during a next transmission time slot corresponding to the type of the received transmission data and to register retransmission of the received transmission data in a retransmission data list after completion of the transmission of the received transmission data during the next transmission time slot by adding an entry to the retransmission data list including a future time as a retransmission time at which the received transmission data is to be retransmitted and a memory address where the received transmission data is stored, and
the second transmission control causes the processing circuitry of the communication device to calculate a retransmission time at which the received transmission data is to be transmitted during the next transmission time slot corresponding to the type of the received transmission data and register the retransmission of the received transmission data in the retransmission data list using the calculated retransmission time as the retransmission time and to transmit the received transmission data during the calculated retransmission time registered in the retransmission data list.

* * * * *